US012804097B2

(12) United States Patent
Onoto

(10) Patent No.: US 12,804,097 B2
(45) Date of Patent: Nov. 17, 2026

(54) STORAGE MEDIUM STORING COMPUTER-READABLE INSTRUCTIONS CAUSING COMPUTER TO EXECUTE IMAGE PROCESS ON IMAGE DATA TO GENERATE OUTPUT DATA RELATED TO DEFECT IN APPEARANCE OF OBJECT

(71) Applicant: BROTHER KOGYO KABUSHIKI KAISHA, Nagoya (JP)

(72) Inventor: Shoji Onoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 259 days.

(21) Appl. No.: 18/643,168

(22) Filed: Apr. 23, 2024

(65) Prior Publication Data

US 2024/0275903 A1 Aug. 15, 2024

Related U.S. Application Data

(63) Continuation of application No. PCT/JP2022/039284, filed on Oct. 21, 2022.

(30) Foreign Application Priority Data

Nov. 1, 2021 (JP) ................................ 2021-178700
Jul. 1, 2022 (JP) ................................ 2022-107390

(51) Int. Cl.
*H04N 1/56* (2006.01)

(52) U.S. Cl.
CPC .................................... *H04N 1/56* (2013.01)

(58) Field of Classification Search
None
See application file for complete search history.

(56) References Cited

U.S. PATENT DOCUMENTS 7,346,227 B2 * 3/2008 Minkin .............. G08B 13/1968 348/32
2008/0089581 A1 * 4/2008 Pitie ......................... H04N 1/60 382/168

(Continued)

FOREIGN PATENT DOCUMENTS

CN 107452030 A * 12/2017 ............ G06T 7/136
CN 109829903 A * 5/2019

(Continued)

OTHER PUBLICATIONS

International Preliminary Report on Patentability and Written Opinion received from the International Bureau in related PCT/JP2022/039284 dated May 2, 2024 together with English language translations.

(Continued)

*Primary Examiner* — Fan Zhang
(74) *Attorney, Agent, or Firm* — Scully, Scott, Murphy & Presser, P.C.

(57) ABSTRACT

A computer generates processed original image data by executing a first image process on original image data. The original image data represents an object image to be printed. The computer generates processed capture image data by executing a second image process on captured image data. The captured image data represents a captured object image. The captured object image is obtained by capturing an image of a printed object. The printed object is produced by printing the object image. The computer generates output data by executing a third image process on the processed original image data and the processed captured image data. The output data is related to a defect in an appearance of the printed object. The first image process includes a first process, which is not included in the second image process.

(Continued)

The second image process includes a second process, which is not included in the first image process.

18 Claims, 11 Drawing Sheets

(56) References Cited

U.S. PATENT DOCUMENTS

| | | | | |
|---|---|---|---|---|
| 2018/0131815 | A1* | 5/2018 | Spivakovsky | H04N 1/00015 |
| 2019/0228506 | A1* | 7/2019 | DeWeert | G06T 5/73 |
| 2019/0228522 | A1 | 7/2019 | Shinoda et al. | |
| 2020/0226420 | A1* | 7/2020 | Shaubi | G06V 10/774 |
| 2020/0311895 | A1 | 10/2020 | Sakurai | |
| 2021/0073972 | A1* | 3/2021 | Wu | G06N 3/0475 |
| 2021/0319266 | A1* | 10/2021 | Chen | G06F 18/2155 |
| 2022/0284567 | A1 | 9/2022 | Ohya et al. | |

FOREIGN PATENT DOCUMENTS

| | | | |
|---|---|---|---|
| JP | 2004-125434 | A | 4/2004 |
| JP | 2008-040705 | A | 2/2008 |
| JP | 2019-129169 | A | 8/2019 |
| JP | 2020-160616 | A | 10/2020 |
| JP | 2020-186938 | A | 11/2020 |
| JP | 2021-060962 | A | 4/2021 |

OTHER PUBLICATIONS

International Search Report dated Nov. 29, 2022 received in PCT/JP2022/039284.

* cited by examiner

STORAGE MEDIUM STORING COMPUTER-READABLE INSTRUCTIONS CAUSING COMPUTER TO EXECUTE IMAGE PROCESS ON IMAGE DATA TO GENERATE OUTPUT DATA RELATED TO DEFECT IN APPEARANCE OF OBJECT

REFERENCE TO RELATED APPLICATIONS

This is a by-pass continuation application of International Application No. PCT/JP2022/039284 filed on Oct. 21, 2022 which claims priorities from Japanese Patent Application No. 2021-178700 filed on Nov. 1, 2021 and Japanese Patent Application No. 2022-107390 filed on Jul. 1, 2022. The entire contents of the International Application and the priority applications are incorporated herein by reference.

BACKGROUND ART

Conventionally, captured image data has been used in visual inspections and other processes related to the appearance of an object. For example, a captured image of a workpiece is inputted into a trained model to inspect the appearance of the workpiece. The model is trained using supervised data. Japanese Patent Application Publication No. 2021-060962 proposes a method of generating supervised data in which a captured image of the workpiece is segmented into a plurality of regions, and each region is marked to indicate whether the region contains prescribed information.

SUMMARY

However, it is not easy to generate data related to defects in the appearance of a workpiece, and the conventional technology leaves room for improvement.

In view of the foregoing, it is an object of the present disclosure to provide a technology for generating data related to defects in the appearance of an object.

In order to attain the above and other object, according to one aspect, the present disclosure provides a non-transitory computer-readable storage medium storing a set of computer-readable instructions for a computer. The computer is configured to perform processing on image data. The set of computer-readable instructions, when executed by the computer, causes the computer to perform: generating processed original image data; generating processed captured image data; and generating output data. The generating processed original image data is performed by executing a first image process on original image data. The original image data represents an object image to be printed. The generating processed captured image data is performed by executing a second image process on captured image data. The captured image data represents a captured object image. The captured object image is obtained by capturing an image of a printed object. The printed object is produced by printing the object image. The generating output data is performed by executing a third image process on the processed original image data and the processed captured image data. The output data is related to a defect in an appearance of the printed object. The first image process includes a first process. The first process is not included in the second image process. The second image process includes a second process. The second process is not included in the first image process.

With the above configurations, the processed original image data is generated by executing the first image process including the first process, which is not included in the second image process, and the processed captured image data is generated by executing the second image process including the second process, which is not included in the first image process. Hence, by using the processed original image data and the processed captured image data, the computer can generate suitable output data related to a defect in the appearance of the printed object.

According to another aspect, the present disclosure also provides a non-transitory computer-readable storage medium storing a set of computer-readable instructions for a computer. The computer is configured to perform processing on image data. The set of computer-readable instructions, when executed by the computer, causes the computer to perform: generating processed original image data; generating processed captured image data; and generating output data. The generating processed original image data is performed by executing a first image process on original image data. The original image data represents an object image which is a design image of a target object. The generating processed captured image data is performed by executing a second image process on captured image data. The captured image data represents a captured object image. The captured object image is obtained by capturing an image of the target object. The generating output data is performed by executing a third image process on the processed original image data and the processed captured image data. The output data is related to a defect in an appearance of the target object. The third image process includes a process using a machine learning model that has been trained. The first image process includes a first process. The first process is not included in the second image process. The second image process includes a second process. The second process is not included in the first image process. The first process includes a pre-process. The pre-process includes at least one of a noise adding process and a blurring process. The noise adding process, when executed on first target image data representing a first target image, adds noise to the first target image. The blurring process, when executed on second target image data representing a second target image, blurs the second target image. The machine learning model has been trained using training image data. The training image data is generated by executing processes including a process identical to the pre-process on the original image data.

With the above configurations, the processed original image data is generated by executing the first image process including the first process, which is not included in the second image process, the processed captured image data is generated by executing the second image process including the second process, which is not included in the first image process, and the machine learning model has been trained using the training image data which is generated by executing processes including a process identical to the pre-process which is included in the first process on the original image data. Hence, by using the processed original image data and the processed captured image data and executing the third image process including a process using the machine learning model that has been trained, the computer can generate suitable output data related to a defect in the appearance of the target object.

According to still another aspect, the present disclosure also provides a non-transitory computer-readable storage medium storing a set of computer-readable instructions for a computer. The computer is configured to perform processing on image data. The set of computer-readable instructions, when executed by the computer, causes the computer to perform: generating processed original image data; generating processed captured image data; and generating output data. The generating processed original image data is performed by executing a first image process on original image data. The original image data represents a photographed image of an appearance of a target object. The generating processed captured image data is performed by executing a second image process on captured image data. The captured image data represents a captured object image. The captured object image is obtained by capturing an image of a printed object. the printed object is produced by printing an object image. The generating output data is performed by executing a third image process on the processed original image data and the processed captured image data. The output data is related to a defect in an appearance of the printed object. The first image process includes a first process. The first process is not included in the second image process. The second image process includes a second process. The second process is not included in the first image process.

The technology disclosed herein can be implemented in various aspects, such as image processing methods and data processing apparatuses, methods and devices for training machine learning models, computer programs for implementing the functions of those methods, apparatuses, or devices, recording media storing those computer programs (e.g., non-transitory storage media), machine learning models that have been trained, and the like.

DESCRIPTION

A. Embodiment

A1. Device Configuration

Figure 1:
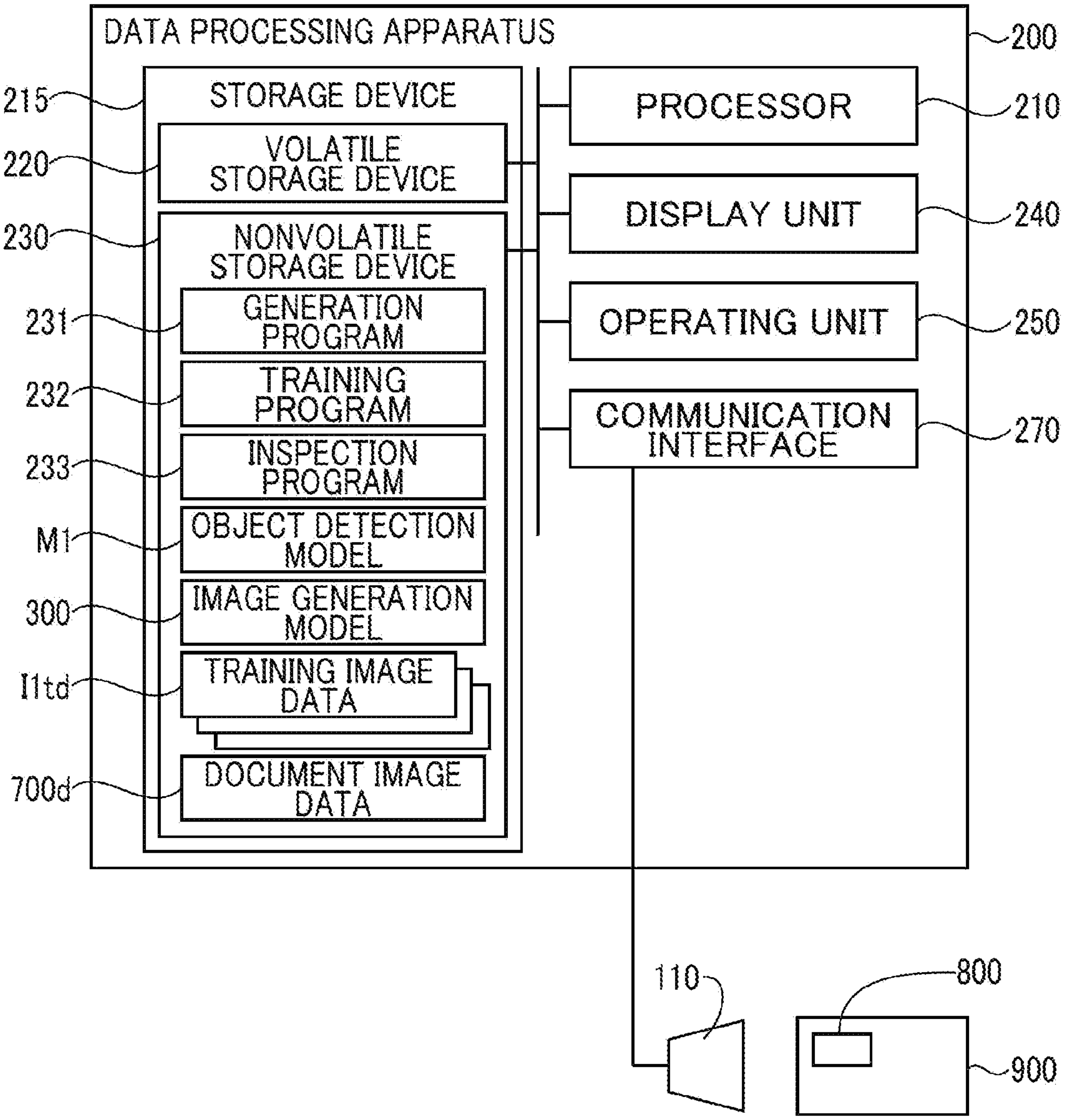
FIG. 1 is a block diagram illustrating a data processing apparatus.

FIG. 1 is a block diagram illustrating a data processing apparatus 200 according to an embodiment of the present disclosure. The data processing apparatus 200 in the present embodiment is a personal computer. The data processing apparatus 200 performs various data processes for inspecting the appearance of an object (e.g., a label sheet provided on a multifunction peripheral or other product). The following description will focus on inspecting the appearance of a label sheet 800 disposed on a multifunction peripheral (MFP) 900.

The data processing apparatus 200 includes a processor 210, a storage device 215, a display unit 240, an operating unit 250, and a communication interface 270. The above components are interconnected via a bus. The storage device 215 includes a volatile storage device 220, and a nonvolatile storage device 230.

The processor 210 is a device, such as a CPU, that is configured to perform data processing. The volatile storage device 220 is DRAM, for example. The nonvolatile storage device 230 is flash memory, for example. The nonvolatile storage device 230 stores a generation program 231, a training program 232, an inspection program 233, an object detection model M1, an image generation model 300, a plurality of sets of training image data I1*td*, and document image data 700*d*. In the present embodiment, the object detection model M1 and image generation model 300 are program modules used for forming machine learning models. The programs 231-233, models M1 and 300, and image data I1*td* and 700*d* will be described later in greater detail.

The display unit 240 is a device configured to display images, such as a liquid crystal display or an organic light-emitting diode display. The operating unit 250 is a device configured to receive operations by the operator, such as a touchscreen arranged over the display unit 240, buttons, levers, and the like. By operating the operating unit 250, the operator can input various requests and instructions into the data processing apparatus 200. The communication interface 270 is an interface for communicating with other devices, such as a USB interface, a wired LAN interface, or a wireless communication interface conforming to the IEEE 802.11 standard. A digital camera 110 is connected to the communication interface 270. The digital camera 110 is used for photographing the label sheet 800, i.e., capturing images of the label sheet 800.

Figure 2:
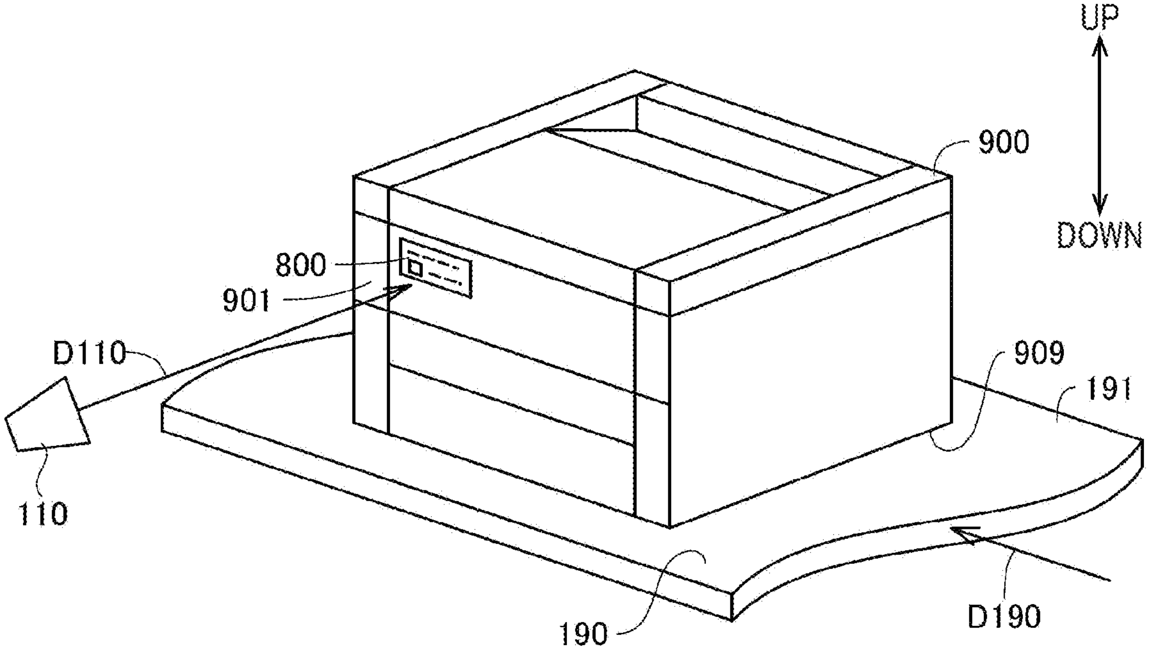
FIG. 2 is a perspective view illustrating a digital camera, a multifunction peripheral, and a belt.

FIG. 2 is a perspective view illustrating the digital camera 110, the MFP 900, and a belt 190. In the present embodiment, the belt 190 is part of a belt conveyor used to convey MFPs 900. FIG. 2 illustrates only a section of the belt 190. The belt 190 is arranged to form a flat upper surface 191. The MFP 900 is placed on the belt 190 so that a bottom surface 909 of the MFP 900 contacts the upper surface 191 of the belt 190. The belt conveyor is configured to move the MFP 900 in a conveying direction D190 so that the MFP 900 passes in front of the digital camera 110. The conveying direction D190 crosses a photographing (shooting) direction D110 of the digital camera 110. For example, the conveying direction D190 is roughly orthogonal to the photographing direction D110. The label sheet 800 is affixed to a first side surface 901 of the MFP 900. The digital camera 110 is disposed in a position for photographing the label sheet 800.

A2. Label Sheet

Figure 3A:
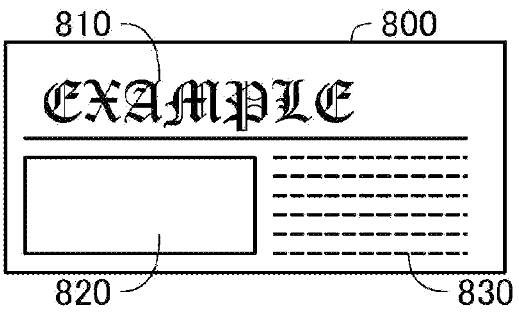
FIG. 3A is a schematic diagram illustrating an example of a label sheet.

FIG. 3A is a schematic diagram illustrating an example of a label sheet. The label sheet 800 is a rectangular sheet. FIG. 3A illustrates a label sheet 800 that is free of defects (a label sheet 800 with no defects). The label sheet 800 can depict various objects. In this example, the label sheet 800 depicts a logotype 810, a mark 820, and explanatory text 830. Details of the mark 820 and explanatory text 830 have been omitted from the drawing.

Figure 3B:
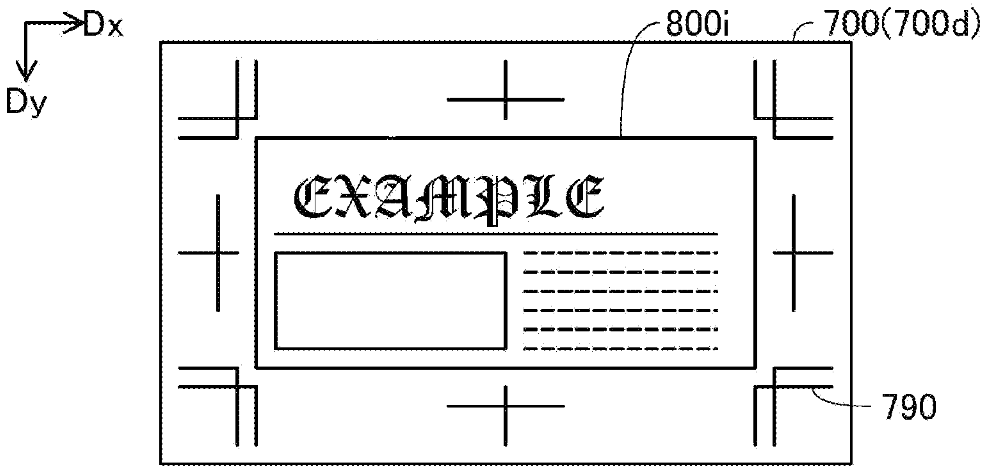
FIG. 3B is a schematic diagram illustrating an example of a design image for the label sheet.

FIG. 3B is a schematic diagram illustrating an example of a design image for the label sheet 800. A design image is an image showing the design of an object such as the label sheet 800. In the present embodiment, the label sheet 800 is produced by printing an image of the label sheet 800 on a sheet. The image of the label sheet 800 is an object image 800*i* (also called the design image 800*i*). A document image 700 in FIG. 3B depicts the design image 800*i* together with trim marks 790. The trim marks 790 are also called crop marks and indicate edge portions of the document image 700 that should be cut off after printing. When producing the label sheet 800, the document image 700 is printed on a sheet in accordance with the document image data 700*d* representing the document image 700. The label sheet 800 is then finished by cutting off the edge portions defined by the trim marks 790. The document image data 700*d* is also called “block copy data”. In the present embodiment, the document image data 700*d* is color bitmap data. However, the document image data 700*d* may have any data format.

A3. Image Generation Model 300

Figure 4A:
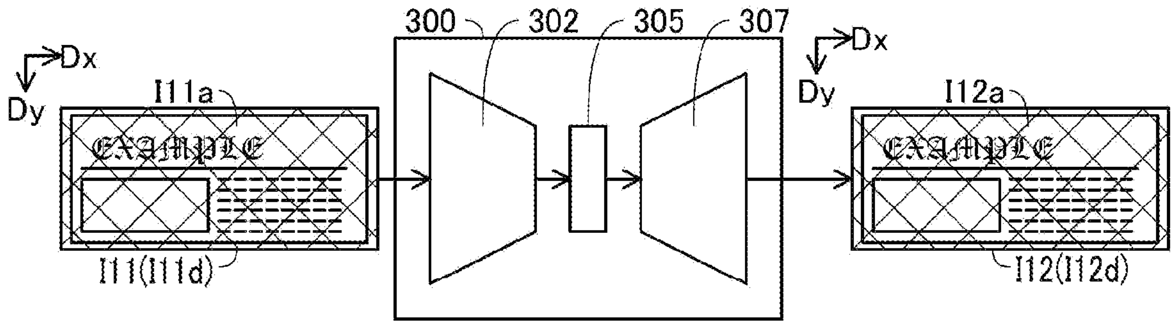
FIG. 4A is a block diagram illustrating an example of an image generation model.

FIG. 4A is a block diagram illustrating an example of the image generation model 300. The image data inputted into the image generation model 300 is input image data I11*d*. The image data generated by the image generation model 300 is generated image data I12*d*. Each of the image data I11*d* and I12*d* in the present embodiment is grayscale bitmap data. The image data I11*d* and I12*d* represent images I11 and I12, respectively. The images I11 and I12 are rectangular in shape and have two parallel sides aligned in a first direction Dx, and two parallel sides aligned in a second direction Dy orthogonal to the first direction Dx. The images I11 and I12 are represented by color values (luminance values in the present embodiment) for each of a plurality of pixels. The pixels are arranged in a matrix configuration having rows in the first direction Dx and columns in the second direction Dy. The number of pixels in the first direction Dx and the number of pixels in the second direction Dy are both predetermined and are the same for both the image data I11*d* and I12*d*.

As will be described later, image data representing an image of the label sheet 800 captured by the digital camera 110 (see FIG. 2) is inputted into the image generation model 300. The input image I11 represented by the input image data I11*d* includes a captured image I11*a* of the label sheet 800 (see FIG. 3A). The label sheet 800 may contain defects. The image generation model 300 is trained to produce a generated image I12 containing an image I12*a* of the same label sheet 800 that is free of defects, i.e., that contains no defects. The size and position in the generated image I12 of the image I12*a* for the label sheet 800 is the same as the size and position in the input image I11 of the captured image I11*a* for the label sheet 800.

The image generation model 300 in the present embodiment is referred to as a variation autoencoder (VAE). The image generation model 300 has an encoder 302 and a decoder 307. The encoder 302 performs dimensionality reduction on the input image data I11*d* to generate latent data 305 indicating features of the input image I11. The decoder 307 performs dimensionality restoration on the latent data 305 to produce the generated image data I12*d*. The encoder 302 and decoder 307 may each have any of various configurations. For example, the encoder 302 may have one or more fully-connected layers that calculate the mean and standard deviation using the input image data I11*d*, and a layer that generates the latent data 305 using this mean and standard deviation. When generating the latent data 305, noise can be introduced according to a method known as the reparameterization trick. The decoder 307 may also have one or more fully-connected layers that calculate the generated image data I12*d* using the latent data 305. The number of dimensions of the latent data 305 may be any of various numbers smaller than the number of dimensions of the image data I11*d* and I12*d*. The mean and standard deviation may be calculated for each element in the latent data 305.

A4. Training Image Data Generation Process

Figure 5:
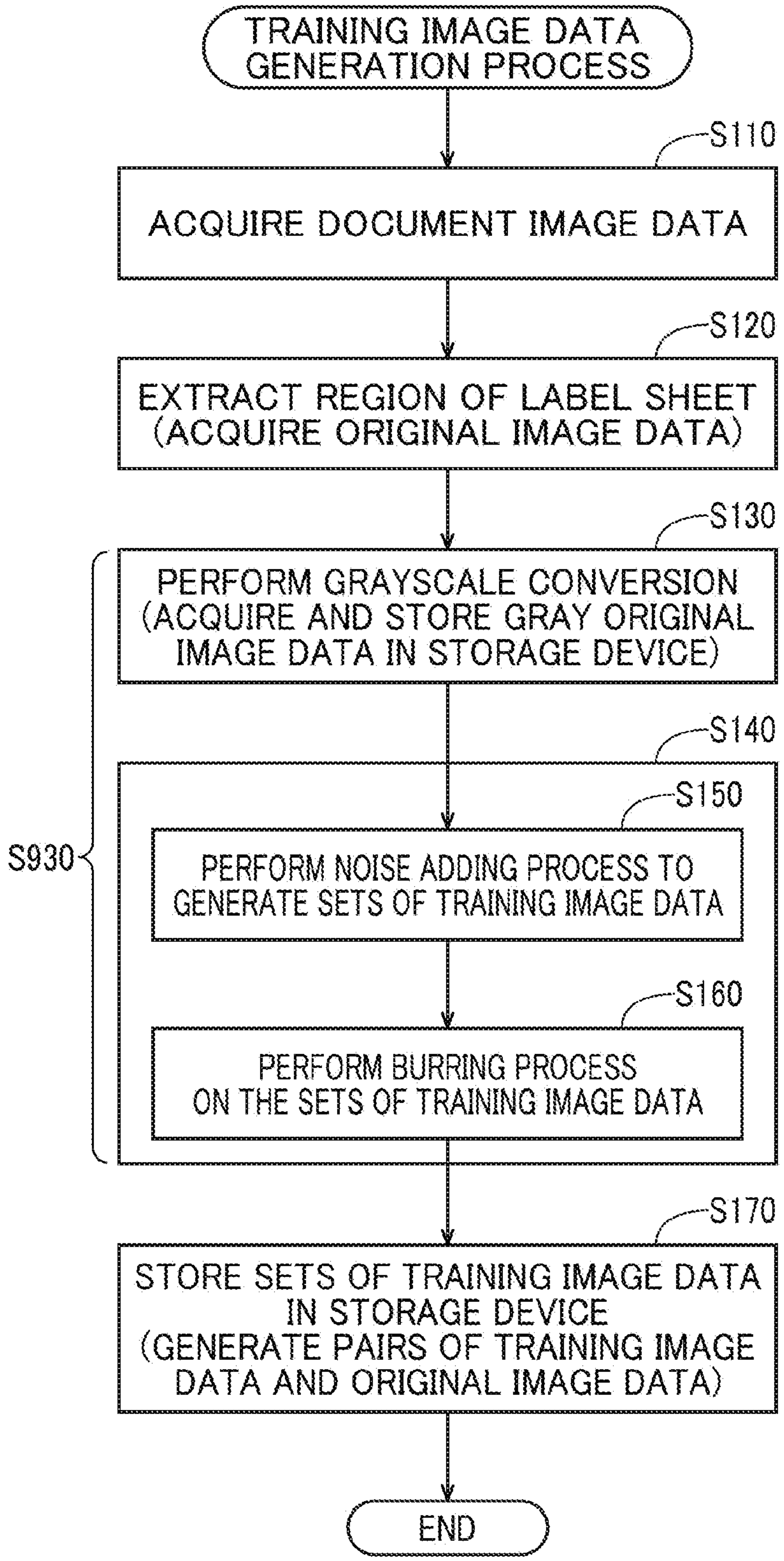
FIG. 5 is a flowchart illustrating an example of steps in a training image data generation process.

FIG. 5 is a flowchart illustrating an example of steps in a process for generating training image data used to train the image generation model 300 (training image data generation process). In the present embodiment, the processor 210 (see FIG. 1) uses the document image data 700*d* (see FIG. 3B) to generate a plurality of sets of training image data representing images that are similar to the captured image. The processor 210 executes the process in FIG. 5 according to the generation program 231.

Figure 3C:
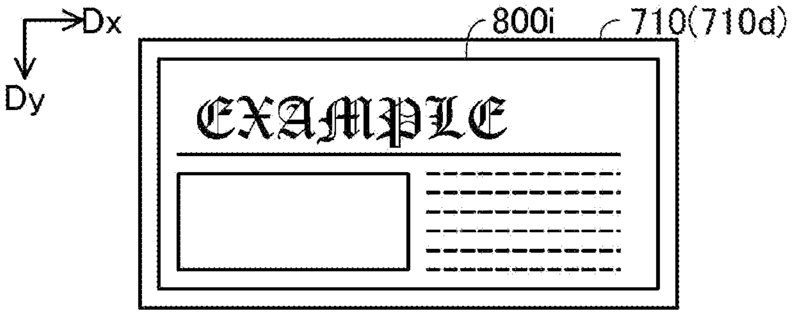
FIG. 3C is a schematic diagram illustrating an example of an original image represented by original image data.

In S110 of FIG. 5, the processor 210 acquires the document image data 700*d* (see FIG. 3B) from the nonvolatile storage device 230. In S120 the processor 210 acquires original image data from the document image data 700*d*. The original image data is bitmap data for the region that contains the design image 800*i*. FIG. 3C is a schematic diagram illustrating an example of an original image 710 represented by original image data 710*d*. The original image 710 represented by the original image data 710*d* includes the design image 800*i* and its surrounding area in the document image 700 (see FIG. 3B). The number of pixels aligned in the first direction Dx of the original image 710 and the number of pixels aligned in the second direction Dy of the original image 710 are the same as those in the image inputted into the image generation model 300 (e.g., the input image I11; see FIG. 4A).

Here, the processor 210 extracts a predetermined region of the document image 700 (see FIG. 3B) in S120 as the region of the original image 710. As an alternative, the processor 210 may analyze the trim marks 790 to determine the region of the original image 710.

Figure 3D:
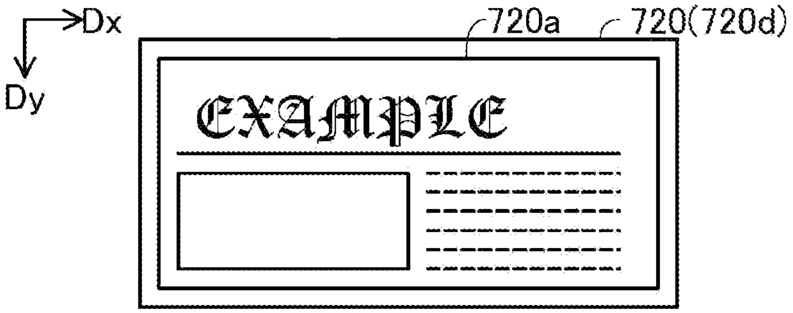
FIG. 3D is a schematic diagram illustrating an example of a gray original image represented by gray original image data.

In S130 the processor 210 performs grayscale conversion on the original image data 710*d* to generate gray original image data. In this conversion, RGB color values are converted to luminance values using prescribed relational expressions (e.g., a color conversion formula for converting values in the RGB color space to values in the YCbCr color space). FIG. 3D is a schematic diagram illustrating an example of a gray original image 720 represented by gray original image data 720*d*. The gray original image 720 includes a gray design image 720*a*, which is the design image 800*i* converted to a grayscale image. In S130 the processor 210 stores the generated gray original image data 720*d* in the storage device 215 (e.g., the nonvolatile storage device 230).

In S140 the processor 210 uses the gray original image data 720*d* to generate P sets of training image data (where P is an integer greater than or equal to two). Step S140 includes steps S150 and S160.

In S150 the processor 210 executes a noise adding process P times on the gray original image data 720*d* to generate P sets of training image data I1*td*. The noise adding process is performed to generate training images that are similar to the captured image. In the present embodiment, the processor 210 adds noise values randomly generated from a Gaussian distribution to respective color values for the plurality of pixels. This noise is also referred to as Gaussian noise. In the present embodiment, the processor 210 generates a noise value for each pixel and a noise value for each image.

The mean value and standard deviation of the Gaussian distribution is determined experimentally in advance using captured images. For example, the experiment uses a plurality of captured images captured by the digital camera 110 (see FIG. 2) in a dark environment where no light illuminates the digital camera 110. These captured images are all plain black images. However, the color value for any one pixel may vary among the plurality of captured images due to noise. The standard deviation of the Gaussian distribution may be set to a value corresponding to this variation in color values. The mean value of the Gaussian distribution may be set to zero.

In S160 the processor 210 performs a blurring process on each of the P sets of training image data I1*td*. The blurring process serves to generate training images that are similar to the captured image. The image of the label sheet 800 may be blurred in the captured image due to a variety of reasons. For example, the MFP 900 (see FIG. 2) is conveyed by the belt 190 in the present embodiment, and the digital camera 110 photographs the MFP 900 while the MFP 900 is stopped in front of the digital camera 110. However, deformation in the belt 190 may cause the MFP 900 to vibrate after the belt 190 is halted. The MFP 900 may vibrate parallel to the conveying direction D190, for example. This vibration diminishes over time. In a case where the MFP 900 is vibrating when the label sheet 800 is photographed by the digital camera 110, the image of the label sheet 800 may be blurry. Such blurring caused by movement of the subject is also called "motion blur."

Motion blur can be reproduced through convolution using the point spread function. The point spread function indicates the degree of spreading caused by motion blur of a color value for a single pixel. In the present embodiment, motion of the MFP 900 is approximated by linear motion parallel to the conveying direction D190. A line segment defined by two parameters, angle and length in the image, can be used as a point spread function that indicates linear motion. The angle and length representing the point spread function are determined experimentally in advance using a captured image. For example, the digital camera 110 is used to photograph the label sheet 800 under the same conditions as those for photographing the label sheet 800 for inspection. The captured image is then analyzed to calculate a motion vector indicating movement of the label sheet 800 within the captured image. The angle and length of this motion vector are used as the angle and length representing the point spread function. In S160 the processor 210 executes a convolution process on the sets of training image data I1*td* using this point spread function to add motion blur to the training image data I1*td*. Here, a plurality of captured images may be used for calculating the motion vector. For example, the motion vector may be calculated from a plurality of images captured within a length of time equivalent to the exposure time of the inspection photographs (captured images). Alternatively, the motion vector may be calculated using video image data taken over a period of time equivalent to the exposure time.

Through the process of S140 (and specifically, the processes of S150 and S160), the processor 210 generates P sets of training image data I1*td*. Each of the P sets of training images has noise and blur and is similar to the captured image of the label sheet 800.

In S170 the processor 210 stores the P sets of training image data I1*td* in the storage device 215 (the nonvolatile storage device 230 in this case). Hence, P training pairs of training image data I1*td* and original image data 710 are generated. Subsequently, the processor 210 ends the process of FIG. 5. The total number P of the sets of training image data I1*td* is preset to a number sufficient for training the image generation model 300 appropriately.

A5. Training Process for Training Image Generation Model 300

Figure 4B:
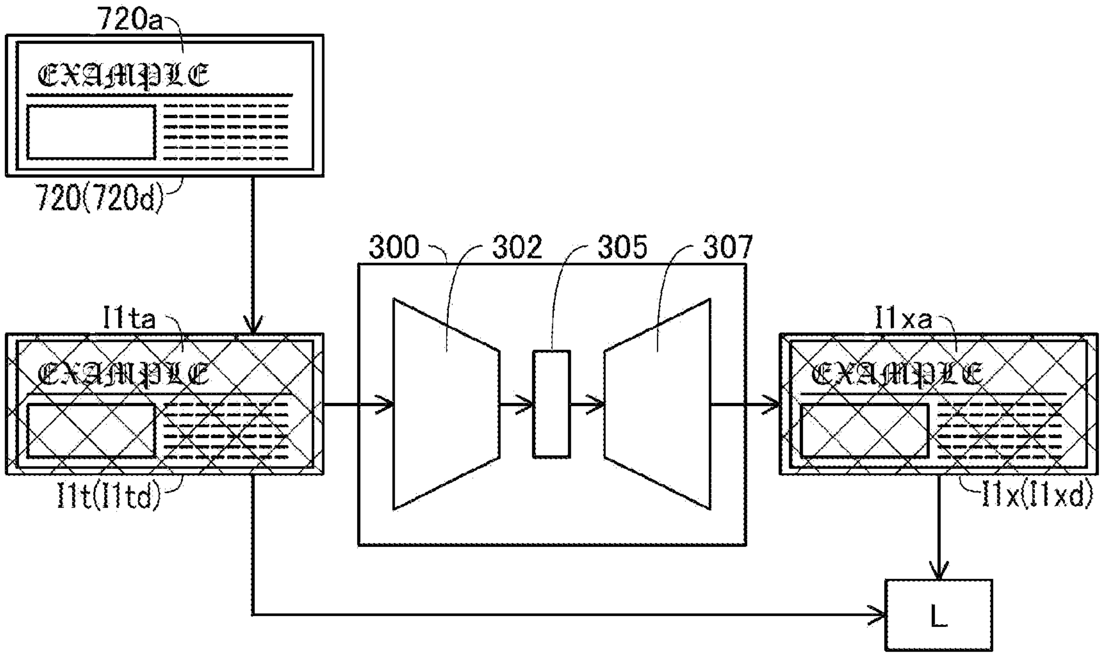
FIG. 4B is a block diagram illustrating an overview of a training process in which the image generation model is being trained.
Figure 6:
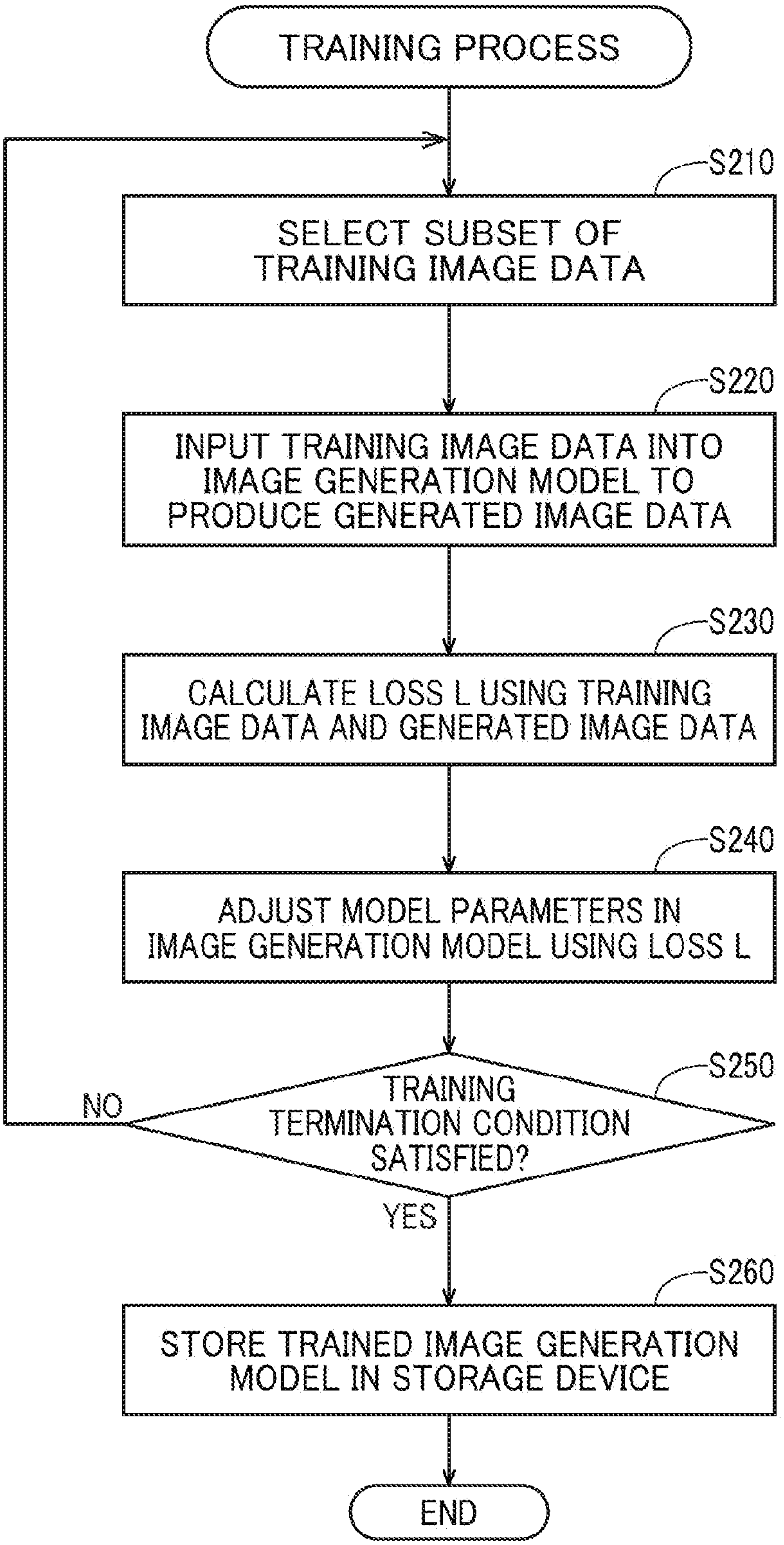
FIG. 6 is a flowchart illustrating an example of steps in a training process for training the image generation model.

FIG. 6 is a flowchart illustrating an example of steps in a training process for training the image generation model 300 (see FIG. 4A). FIG. 4B is a block diagram illustrating an overview of the training process in which the image generation model 300 is being trained. In the present embodiment, the image generation model 300 is trained so that when training image data I1*td* representing a training image I1*t* is inputted into the image generation model 300, the image generation model 300 produces generated image data I1*xd* representing a generated image I1*x* that depicts the same image as the training image I1*t* represented by the inputted training image data I1*td*. The processor 210 executes the process in FIG. 6 according to the training program 232.

In S210 of FIG. 6, the processor 210 acquires a subset of the P sets of training image data I1*td* generated in the process of FIG. 5. The subset is configured of a plurality of sets of training image data I1*td*. The processor 210 selects a plurality of sets of unprocessed training image data I1*td* as the subset. The total number of sets of training image data I1*td* in the subset is preset.

In S220 the processor 210 inputs each set of training image data I1*td* in the subset into the image generation model 300 to produce a set of generated image data I1*xd*. The processor 210 produces the generated image data I1*xd* by performing the operation (calculation) for each layer of the image generation model 300 using model parameters for the corresponding layers. A single set of generated image data I1*xd* is generated for each set of training image data I1*td* included in the subset.

In S230 the processor 210 calculates evaluation values using the training image data I1*td* and the generated image data I1*xd*. An evaluation value is calculated for each set of training image data I1*td*. Next, the processor 210 calculates a loss L using the plurality of evaluation values calculated from the plurality of sets of training image data I1*td* included in the subset. The loss L may be the sum of the plurality of evaluation values, for example.

Any method suitable for training the image generation model 300 may be used for calculating the evaluation values. Since the image generation model 300 is a VAE in the present embodiment, various values capable of maximizing the variational lower bound can be employed as an evaluation value. For example, the evaluation value may be the sum of a reconstruction error and a regularization error. The reconstruction error is a parameter indicating the difference between the training image I1*t* and generated image I1*x*, such as a cross-entropy error. The regularization error is a parameter indicating the difference between a combination of the mean and standard deviation used to calculate the latent data 305 and the standard normal distribution, for instance. As an example, the regularization error may be calculated using the formula "$-(1+\log(s^2)-m^2-s^2)/2$" (where m is the mean and s is the standard deviation). This formula specifies the error in one element of the latent data 305. The regularization error may be the sum of errors for all elements of the latent data 305.

In S240 the processor 210 adjusts the plurality of model parameters in the image generation model 300 to reduce the loss L. An algorithm using error backpropagation and gradient descent, for example, may be employed to adjust the plurality of model parameters. Here, the optimizer known as Adam may be used.

In S250 the processor 210 determines whether a training termination condition has been satisfied. The training termination condition may be any condition indicating that the image generation model 300 has been properly trained. In the present embodiment, the training termination condition is the condition that the operator has inputted a termination instruction. Specifically, the processor 210 randomly acquires a prescribed number of sets of training image data I1*td* that have not been used in training from the P sets of training image data I1*td*. The processor 210 then inputs each of the plurality of sets of the acquired training image data I1*td* into the image generation model 300 to produce generated image data I1*xd*, thereby acquiring a plurality of sets of generated image data I1*xd* representing a plurality of generated images I1*x*. The processor 210 displays a plurality of pairs of the training images I1*t* and generated images I1*x* on the display unit 240. By viewing the display unit 240, the operator confirms whether the generated images I1*x* adequately represent the training images I1*t*. Depending on the results of this confirmation, the operator may operate the operating unit 250 to input an instruction to terminate or to continue the training.

Note that the condition for terminating training may be various other conditions. For example, the termination condition may be that the loss L calculated using the prescribed number of sets of training image data I1*td* not used in training is less than or equal to a prescribed loss threshold.

When the processor 210 determines that training has not been terminated (S250: NO), the processor 210 returns to S210 and executes the above process on a new subset. When the processor 210 determines that training has been terminated (S250: YES), in S260 the processor 210 stores the trained image generation model 300 in the storage device 215 (the nonvolatile storage device 230 in this case). Subsequently, the processor 210 ends the process in FIG. 6.

The trained image generation model 300 (see FIG. 4A) produces a generated image I12 from an input image I11 containing a captured image I11*a* of the label sheet 800. The generated image I12 contains an image I12*a* of the same label sheet 800. The layout of an image of the label sheet 800 within the image is also the same for both the input image I11 and the generated image I12.

The image generation model 300 is also trained using the training image data I1*td* representing a trained image I1*t* containing an image I1*ta* of a label sheet 800 with no defects (defect-free label sheet 800) to produce generated image data I1*xd* representing a generated image I1*x* containing an image I1*xa* of the same label sheet 800, i.e., an image of the defect-free label sheet 800. When the label sheet 800 whose image is contained in an image inputted into the image generation model 300 has a defect, the image generation model 300 suitably reconstructs a defect-free partial image (a partial image without defects) from the partial image showing this defect and produces generated image data representing a generated image containing an image of the defect-free label sheet 800.

A6. Inspection Process

Figure 7:
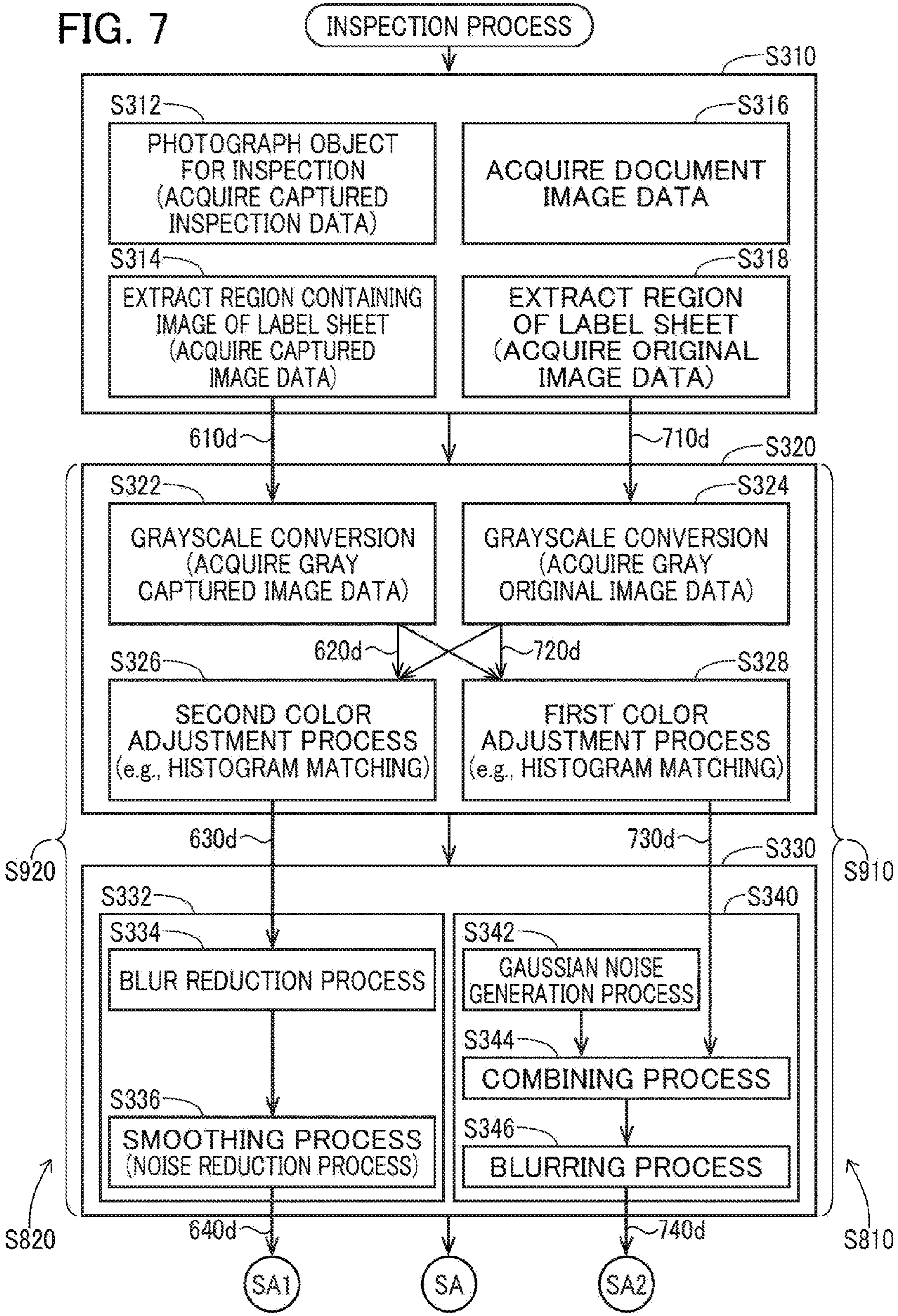
FIG. 7 is a flowchart illustrating an example of steps in a part of an inspection process.
Figure 8:
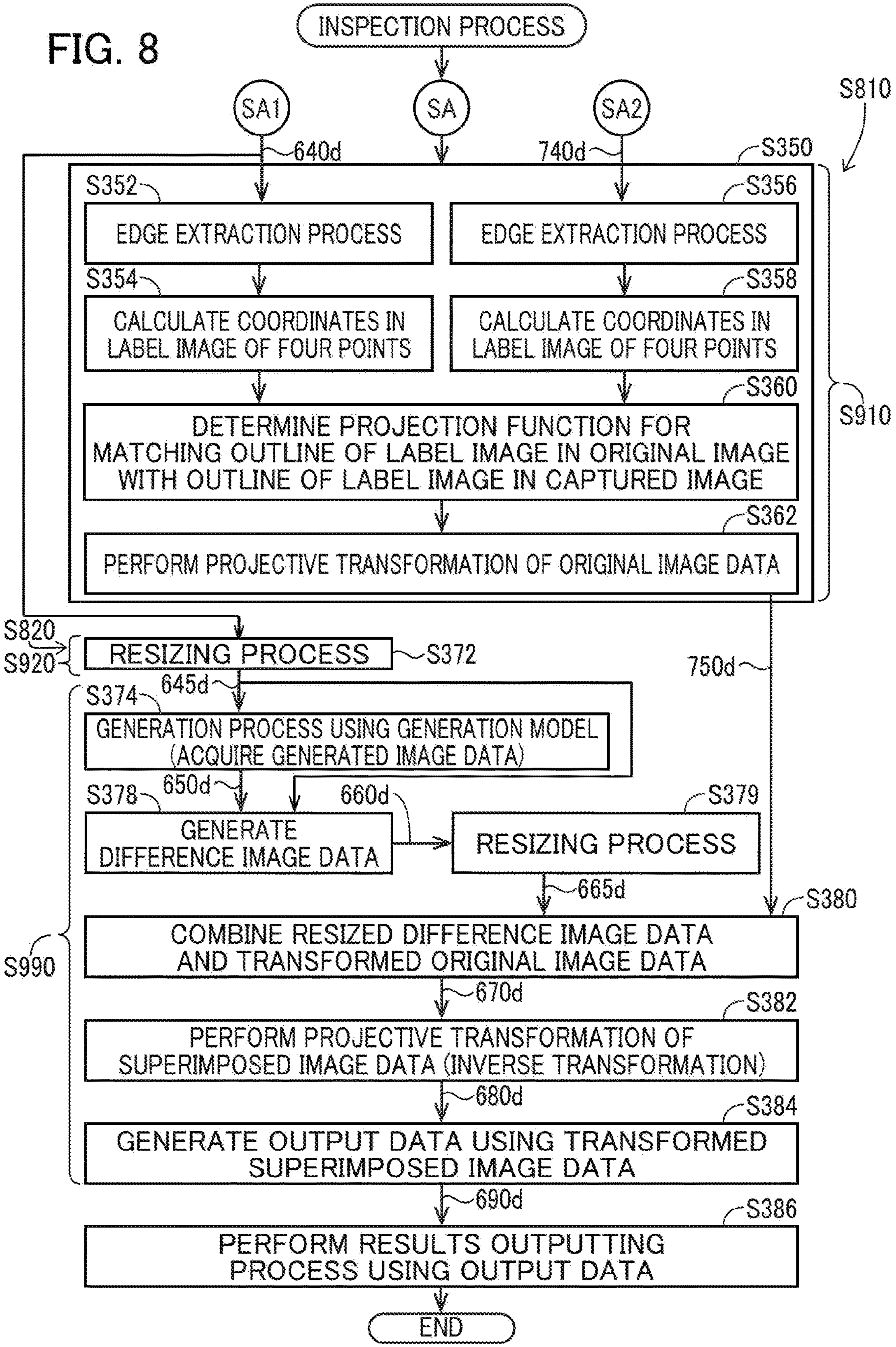
FIG. 8 is a flowchart illustrating an example of steps in a continuation of the inspection process illustrated in FIG. 7.

FIGS. 7 and 8 are flowcharts illustrating an example of steps in an inspection process. FIG. 8 is a continuation of the process illustrated in FIG. 7. By performing the inspection process, the data processing apparatus 200 (see FIG. 1) inspects the label sheet 800 on the MFP 900 (see FIG. 2). The processor 210 executes the inspection process according to the inspection program 233.

In S310 of FIG. 7, the processor 210 performs a process to acquire image data. Step S310 includes steps S312, S314, S316, and S318. In S312 the processor 210 supplies a photographing instruction to the digital camera 110 (see FIG. 2). In response to this instruction, the digital camera 110 photographs an area of the MFP 900 that includes the label sheet 800 and generates captured inspection data, which is image data representing the photographed (captured) image. In the present embodiment, the captured inspection data is color bitmap data that specifies the color of each pixel in the image for the three channels red (R), green (G), and blue (B). As described above, the digital camera 110 performs photographing while the MFP 900 is halted in front of the digital camera 110. The processor 210 acquires data indicating the operating state of the belt 190 from a drive device (not illustrated) of the belt conveyor, for example. The processor 210 then supplies a photographing instruction to the digital camera 110 while the belt 190 is in a halted state.

Figure 9:
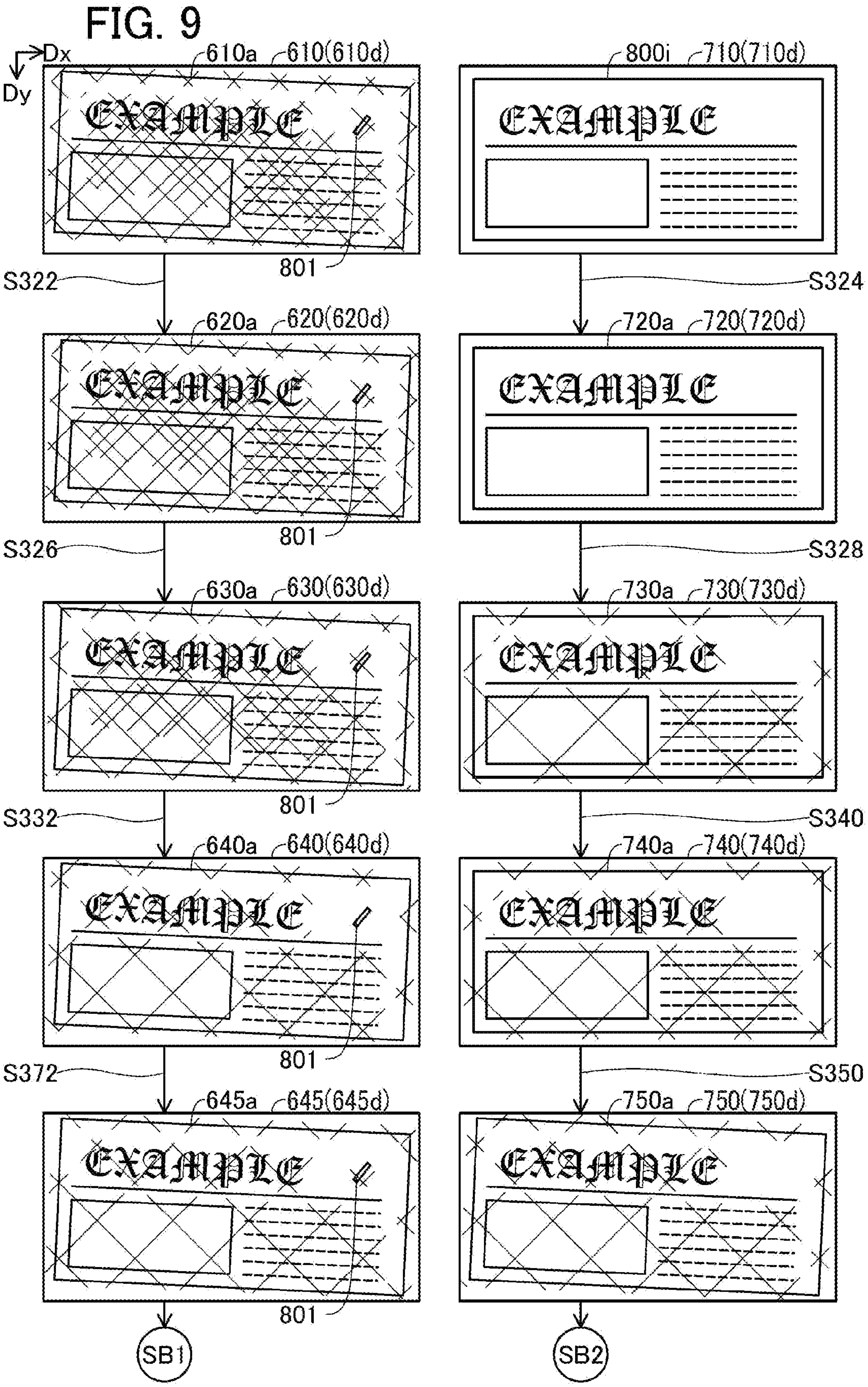
FIG. 9 is a schematic diagram illustrating an example of changes in an image undergoing a part of the inspection process.
Figure 10:
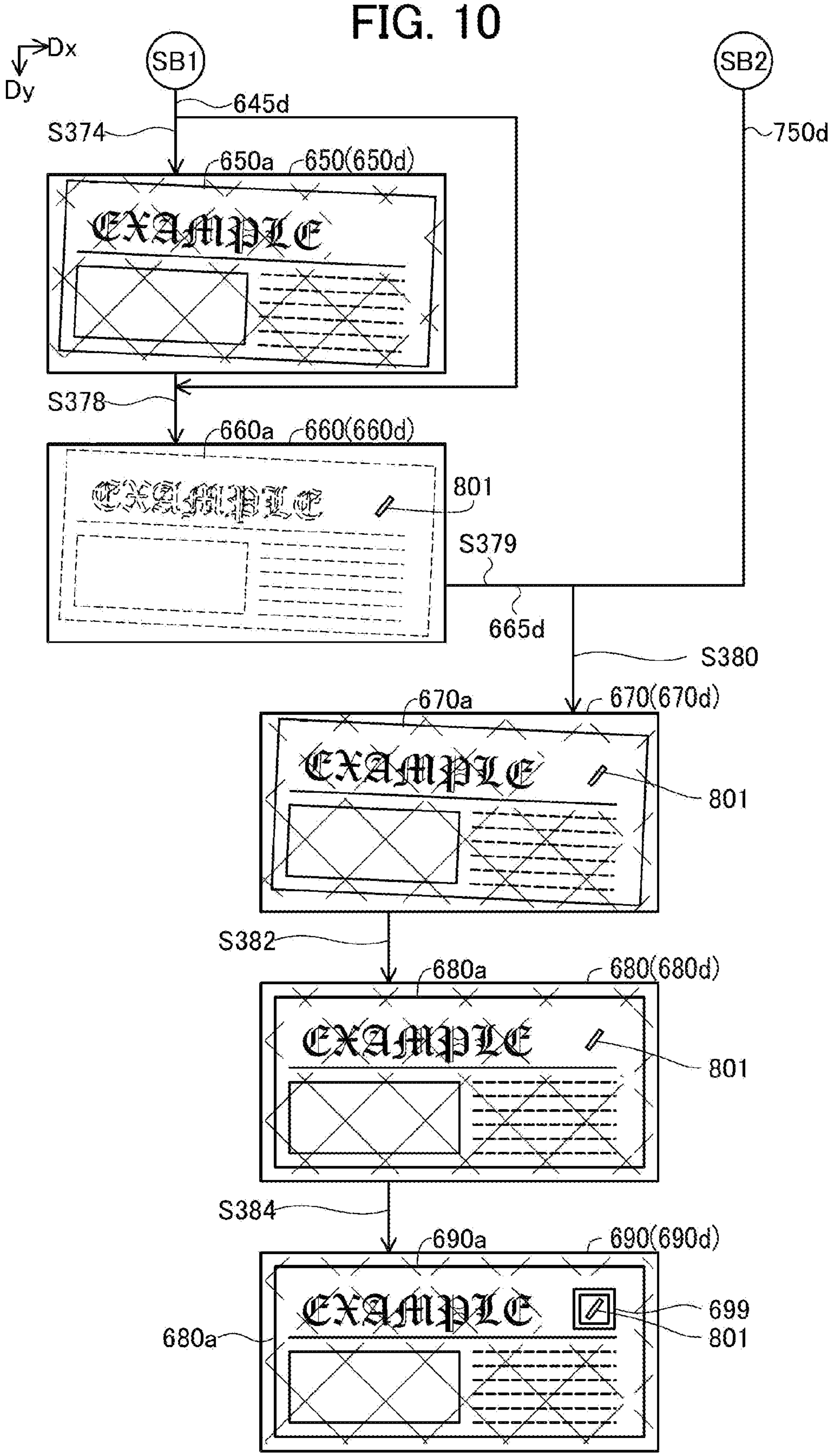
FIG. 10 is a schematic diagram illustrating an example of changes in an image undergoing a continuation of the inspection process.

In S314 the processor 210 acquires captured image data from the captured inspection data. The captured image data is color bitmap data for the area of the captured inspection data that includes an image of the label sheet 800. FIGS. 9 and 10 are schematic diagrams illustrating an example of changes in an image undergoing the inspection process. The first image from the top of the left column in FIG. 9 is an example of an image 610 represented by captured image data 610*d* (hereinafter called the "captured label image 610"). The captured label image 610 is a rectangular image having two parallel sides aligned in the first direction Dx and two parallel sides aligned in the second direction Dy, which is orthogonal to the first direction Dx. The captured label image 610 includes a captured image 610*a* of the label sheet 800. In the example of FIG. 9, the label sheet 800 has a scratch (not illustrated in FIG. 3A), and thus the captured image 610*a* of the label sheet 800 contains a portion depicting this scratch (hereinafter called the "scratch image 801"). The captured image 610*a* of the label sheet 800 is also skewed with respect to the captured label image 610. The captured label image 610 has noise and blur.

In S314 of FIG. 7, the processor 210 in the present embodiment uses the trained object detection model M1 (see FIG. 1) to detect the region in the image represented by the captured inspection data that contains an image of the label sheet 800, i.e., captured image 610*a*. The processor 210 then acquires the captured image data 610*d* representing this detected region from the captured inspection data. In the present embodiment, the object detection model M1 is a model called YOLOv4 (You Only Look Once) that has been pretrained to detect an image of the label sheet 800. Note that the object detection model M1 may be any of various other object detection models, such as a Single Shot MultiBox Detector (SSD) or Region-based Convolutional Neural Networks (R-CNN). Any suitable method may be used to train the object detection model M1.

Steps S316 and S318 of FIG. 7 are identical to steps S110 and S120 of FIG. 5. The processor 210 acquires the document image data 700*d* (see FIG. 3B) in S316 and acquires the original image data 710*d* from the document image data 700*d* in S318. The first image from the top of the right column in FIG. 9 is the original image 710 represented by the original image data 710*d*. This original image 710 is identical to the original image 710 in FIG. 3C.

In S320 of FIG. 7, the processor 210 executes a first pre-process. Step S320 includes steps S322, S324, S326, and S328. In S322 the processor 210 executes grayscale conversion on the captured image data 610*d* to generate grayscale captured image data. The method of grayscale conversion is identical to the method used in S130 of FIG. 5. The second image from the top of the left column in FIG. 9 is an example of a gray captured image 620. The gray captured image 620 is represented by gray captured image data 620*d* generated from the captured image data 610*d*. The gray captured image 620 includes an image 620*a* of the label sheet 800.

In S324 of FIG. 7, the processor 210 executes grayscale conversion on the original image data 710*d* to generate gray original image data 720*d*. The second image from the top of the right column in FIG. 9 is an example of a gray original image 720 represented by the gray original image data 720*d* generated from the original image data 710*d*. This gray original image 720 is identical to the gray original image 720 in FIG. 3D.

Figure 11A:
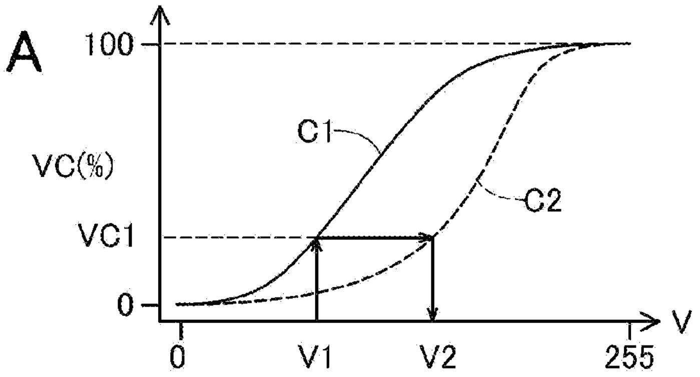
FIG. 11A is an explanatory diagram illustrating an example of a histogram matching process.

In S326 of FIG. 7, the processor 210 executes a second color adjustment process to adjust the color distribution in the gray captured image 620 represented by the gray captured image data 620*d* to be closer to the color distribution in the gray original image 720 represented by the gray original image data 720*d*. In the present embodiment, histogram matching is performed as the color adjustment process. FIG. 11A is an explanatory diagram illustrating an example of the histogram matching process. Specifically, FIG. 11A illustrates a graph of cumulative frequencies VC in which the horizontal axis represents the luminance value V, and the vertical axis represents the cumulative frequency VC (units: %). In the present embodiment, each luminance value V is expressed as one of 256 levels from 0 to 255. The cumulative frequency VC is calculated using a histogram of the luminance values V. Here, each luminance value V constitutes one category of the histogram (referred to as a "bin"). The cumulative frequency VC of a target category is the ratio of the sum of frequencies from the smallest category to the target category (i.e., the cumulative frequency) to the total number of frequencies in the histogram (i.e., the number of pixels).

The graph in FIG. 11A includes a first curve C1 and a second curve C2. The first curve C1 depicts the cumulative frequencies VC for the image data undergoing the color adjustment (hereinafter called the "target image data"). The second curve C2 depicts the cumulative frequencies VC for image data having a reference color distribution. A first luminance value V1 of the target image data is converted to a second luminance value V2. The second luminance value V2 is determined as follows. First, the processor 210 references the first curve C1 for the target image data to acquire the cumulative frequency VC1 corresponding to the first luminance value V1. Next, the processor 210 references the second curve C2 to identify the second luminance value V2 corresponding to the acquired cumulative frequency VC1. An adjusted luminance value V is similarly determined for other luminance values V.

Figure 11B:
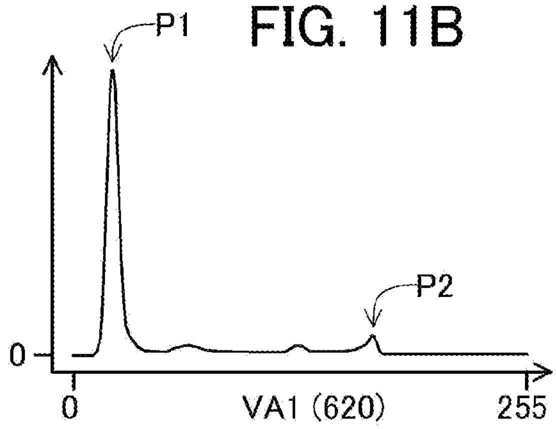
FIG. 11B illustrates an example of a histogram for luminance values in a gray captured image.

FIG. 11B illustrates an example of a histogram for luminance values VA1 in the gray captured image 620 (see FIG. 9). This histogram has a first peak P1 formed by a plurality of pixels representing background areas, and a second peak P2 formed by a plurality of pixels representing objects (characters, marks, etc.). In addition to the peaks P1 and P2, this histogram has several other small peaks. As an alternative, the image of the label sheet 800 may be composed of three or more colors. In this case, the histogram of luminance values could have three or more large peaks.

Figure 11C:
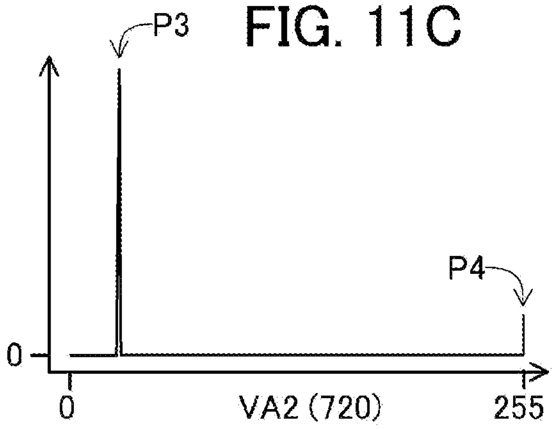
FIG. 11C illustrates an example of a histogram for luminance values in a gray original image.

FIG. 11C illustrates an example of a histogram for luminance values VA2 in the gray original image 720 (see FIG. 9). This histogram has a third peak P3 formed by a plurality of pixels representing background areas, and a fourth peak P4 formed by a plurality of pixels representing objects.

The widths of the peaks P1 and P2 in the gray captured image 620 (FIG. 11B) are greater than the widths of the corresponding peaks P3 and P4 in the gray original image 720 (FIG. 11C). This difference is due to the gray captured image 620 having various noise and various blurring, unlike the gray original image 720.

The third image from the top of the left column in FIG. 9 is an example of a first pre-processed captured image 630. The first pre-processed captured image 630 is represented by first pre-processed captured image data 630*d* that has been generated from the gray captured image data 620*d* in S326 of FIG. 7. The first pre-processed captured image 630 includes an image 630*a* of a label sheet 800 identical to the label sheet 800 depicted by the image 620*a* in the gray captured image 620.

Figure 11D:
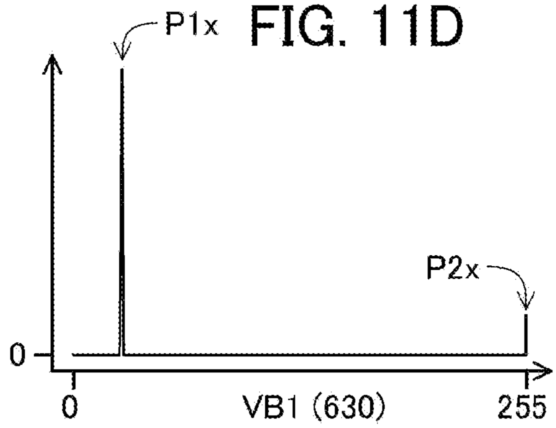
FIG. 11D illustrates an example of a histogram for luminance values in a first pre-processed captured image.

FIG. 11D illustrates an example of a histogram for luminance values VB1 in the first pre-processed captured image 630. This histogram has a first adjusted peak P1*x* that has been converted from the first peak P1 (FIG. 11B), and a second adjusted peak P2*x* that has been converted from the second peak P2. The luminance values VB1 of the adjusted peaks P1*x* and P2*x* approach the luminance values VA2 of the corresponding peaks P3 and P4 in the gray original image 720 (FIG. 11C). Thus, the histogram matching process brings the color distribution in the first pre-processed captured image 630 closer to the color distribution in the gray original image 720 with respect to the peak positions (the luminance values in this case). The widths of the adjusted peaks P1*x* and P2*x* are also smaller than the respective widths of the original peaks P1 and P2. The reason for the widths of the peaks being smaller is that when the color distribution having narrow peaks P3 and P4 (FIG. 11C) is used as the reference color distribution for histogram matching, a large number of luminance values VA1 contained in a peak with a large width (e.g., peak P1) are converted to a small number of luminance values VB1 within a narrow range through histogram matching. Thus, the histogram matching process brings the color distribution in the first pre-processed captured image 630 closer to the color distribution in the gray original image 720 with respect to the widths of peaks.

In S328 of FIG. 7, the processor 210 executes a first color adjustment process (histogram matching in the present embodiment) to adjust the color distribution in the gray original image 720 represented by the gray original image data 720*d* to be closer to the color distribution in the gray captured image 620*d* represented by the gray captured image data 620*d*. The third image from the top in the right column of FIG. 9 is an example of a first pre-processed original image 730. The first pre-processed original image 730 is represented by first pre-processed original image data 730*d* that has been generated from the gray original image data 720*d* in S328. The first pre-processed original image 730 includes a design label image 730*a* whose colors have been adjusted from the gray design image 720*a* in the gray original image 720.

Figure 11E:
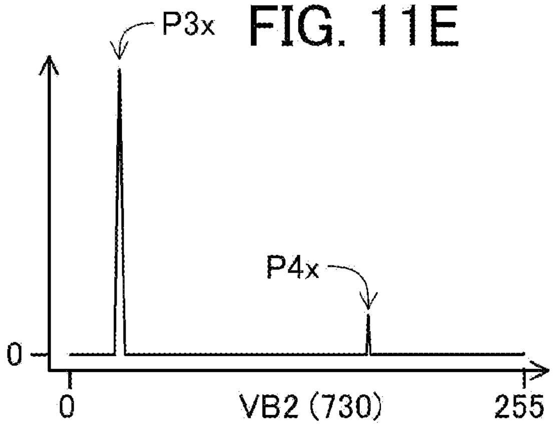
FIG. 11E illustrates an example of a histogram for luminance values in a first pre-processed original image.

FIG. 11E illustrates an example of a histogram for luminance values VB2 in the first pre-processed original image 730. This histogram includes a third adjusted peak P3*x* that has been converted from the third peak P3 (FIG. 11C), and a fourth adjusted peak P4*x* that has been converted from the fourth peak P4. The luminance values VB2 of the adjusted peaks P3*x* and P4*x* approach the luminance values VA1 of corresponding peaks P1 and P2 in the gray captured image 620 (FIG. 11B). Thus, the process of histogram matching adjusts the color distribution in the first pre-processed original image 730 to be closer to the color distribution in the gray captured image 620 with respect to the peak positions (the luminance values in this case). Note that the widths of the adjusted peaks P3*x* and P4*x* are slightly larger than the widths of the original peaks P3 and P4. However, since the widths of the peaks P3 and P4 are small, the widths of the adjusted peaks P3*x* and P4*x* can be smaller than the widths of the corresponding peaks P1 and P2 in the reference color distribution (FIG. 11B).

Figure 11F:
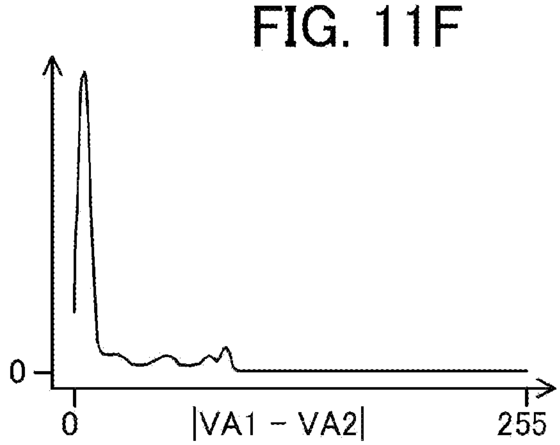
FIG. 11F illustrates an example of a histogram for the absolute values of differences in luminance values for the same pixels in the gray captured image and the gray original image.
Figure 11G:
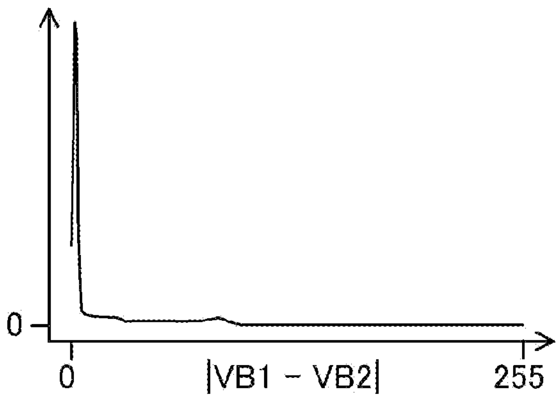
FIG. 11G illustrates an example of a histogram for the absolute values of differences in luminance values for the same pixels in the first pre-processed captured image and the first pre-processed original image.

FIG. 11F illustrates an example of a histogram for the absolute values of differences in luminance values for the same pixels in the gray captured image 620 and the gray original image 720 (|VA1−VA2|). FIG. 11G illustrates an example of a histogram for the absolute values of differences in luminance values for the same pixels in the first pre-processed captured image 630 and the first pre-processed original image 730 (|VB1−VB2|). As illustrated in the graphs, the difference in color-adjusted luminance values (FIG. 11G) is smaller than the difference in luminance values when no color adjustments have been performed (FIG. 11F). Hence, the difference in color distribution between the first pre-processed captured image 630 and the first pre-processed original image 730 is smaller than the difference in color distribution between the gray captured image 620 and the gray original image 720. As will be described below, image data representing a color-adjusted captured image is inputted into the image generation model 300 in order to detect the scratch image 801 (see FIG. 9) in the color-adjusted captured image, i.e., the scratch in the label sheet 800. As described in FIGS. 5 and 6, sets of training image data I1*td* generated from the gray original image data 720*d* are inputted into the image generation model 300 to train the image generation model 300. Since the color adjustment process adjusts the color distribution in each captured image inputted into the image generation model 300 for inspection to be closer to the color distribution in the training image, the image generation model 300 can produce a suitable generated image.

In S330 of FIG. 7, the processor 210 executes a second pre-process. Step S330 includes a pre-process (S332) performed on the first pre-processed captured image data 630*d*, and a pre-process (S340) performed on the first pre-processed original image data 730*d*.

Step S332 includes steps S334 and S336. In S334 the processor 210 executes a blur reduction process on the first pre-processed captured image data 630*d*. The blur reduction process reduces the motion blur described in S160 of FIG. 5. The blur reduction process is also referred to as "deblurring". Any of various blur reduction processes may be employed. In the present embodiment, the processor 210 determines a point spread function using the motion vector described in S160 (and specifically, the angle and length). The processor 210 then generates a Wiener filter using the point spread function. By applying the Wiener filter in the frequency domain, the processor 210 performs filtering on the first pre-processed captured image data 630*d* to generate blur-reduced captured image data.

In S336 the processor 210 performs a smoothing process on the blur-reduced captured image data. The smoothing process is also known as a noise reduction process. For the smoothing process in the present embodiment, the processor 210 performs a filtering process using a mean filter. The size of the kernel in the mean filter is set experimentally in advance in order to reduce noise appropriately.

Through S334 and S336 described above (i.e., S332), the processor 210 generates second pre-processed captured image data 640*d* from the first pre-processed captured image data 630*d*. The fourth image from the top of the left column in FIG. 9 is an example of a second pre-processed captured image 640 represented by the second pre-processed captured image data 640*d*. The second pre-processed captured image 640 includes an image 640*a* of a label sheet 800 identical to the label sheet 800 corresponding to the image 630*a* in the first pre-processed captured image 630. However, the second pre-processed captured image 640 has less noise and blur than the first pre-processed captured image 630.

Step S340 of FIG. 7 includes steps S342, S344, and S346. The process of S342 and S344 is performed to add noise to the first pre-processed original image 730 represented by the first pre-processed original image data 730*d* and overall is similar to the noise adding process described in S150 of FIG. 5. Specifically, in S342 the processor 210 randomly generates a noise value (also called "Gaussian noise") for each pixel according to a Gaussian distribution (Gaussian noise generation process). In S344 the processor 210 combines the first pre-processed original image data 730*d* with the Gaussian noise to produce noise-added original image data (combining process).

In S346 the processor 210 performs a blurring process on the noise-added original image data. The blurring process of S346 is identical to the blurring process described in S160 of FIG. 5.

Through S342-S346 described above (i.e., S340), the processor 210 generates second pre-processed original image data 740*d* from the first pre-processed original image data 730*d*. The fourth image from the top of the right column in FIG. 9 is an example of a second pre-processed original image 740 represented by the second pre-processed original image data 740*d*. The second pre-processed original image 740 includes a design label image 740*a*, which is the design label image 730*a* in the first pre-processed original image 730 with added noise and blur.

In S350 of FIG. 8, the processor 210 performs an outline matching process. Step S350 includes steps S352-S362. In S352 the processor 210 analyzes the second pre-processed captured image data 640*d* (see FIG. 9) to extract edges (edge extraction process). In S354 the processor 210 uses the extracted edges to calculate coordinates in the second pre-processed captured image 640 of four predetermined portions in the image 640*a* of the label sheet 800. In the present embodiment the predetermined portions correspond to the four corners of the label sheet 800. Any method may be used for extracting the edges. For example, the processor 210 calculates an edge amount for each pixel in the second pre-processed captured image 640 using a Laplacian filter and extracts pixels that have an edge amount greater than a prescribed edge threshold as edge pixels. Any method may be used to calculate the coordinates for each of the four portions. For example, the processor 210 may apply a thinning process, such as Hilditch's thinning algorithm, to produce thinner edges. The processor 210 then applies the Hough transform using the thinned edges to detect four straight lines that outline a portion in the second pre-processed captured image 640 corresponding to the label sheet 800 (image 640*a*). From these four lines, the processor 210 calculates the coordinates of the four intersecting points (i.e., the four corners).

Steps S356 and S358 are identical to the respective steps S352 and S354, except that the second pre-processed original image data 740*d* is used in place of the second pre-processed captured image data 640*d*. The processor 210 calculates the coordinates in the second pre-processed original image 740 for the four corners of the design label image 740*a* (see FIG. 9).

In S360 of FIG. 8, the processor 210 determines the projection function for a projective transformation using the coordinates of the four portions in the second pre-processed captured image 640 (FIG. 9) and the coordinates of the four portions in the second pre-processed original image 740. This projection function is used to match the outline of the design label image 740*a* in the second pre-processed original image 740 with the outline of the image 640*a* of the label sheet 800 in the second pre-processed captured image 640. The outline is the shape of the image's contour. In S362 the processor 210 performs a projective transformation of the second pre-processed original image data 740*d* according to the projection function to generate transformed original image data 750*d*. The fifth image from the top of the right column in FIG. 9 is an example of a transformed original image 750 represented by the transformed original image data 750*d*, which has been generated from the second pre-processed captured image data 640*d* and second pre-processed original image data 740*d*. The transformed original image 750 includes a design label image 750*a*, which is an image projected from the design label image 740*a* in the second pre-processed original image 740. The outline of the design label image 750*a* in the transformed original image 750 is identical to the outline of the image 640*a* of the label sheet 800 in the second pre-processed captured image 640.

Note that any method may be used for projective transformation (S360 and S362). For example, the OpenCV (Open Source Computer Vision Library) projective transformation function may be used.

In S372 of FIG. 8, the processor 210 performs a resizing process on the second pre-processed captured image data 640*d* (see FIG. 9) to generate resized second pre-processed captured image data 645*d* (hereinafter called "processed captured image data 645*d*"). This resizing process converts the size of an image represented by the second pre-processed captured image data 640*d* (and specifically the number of pixels in the first direction Dx and the number of pixels in the second direction Dy) to a size that can be inputted into the image generation model 300. Any of various resolution converting processes may be used as the resizing process. The fifth image from the top of the left column in FIG. 9 is an example of a processed captured image 645 represented by the processed captured image data 645*d*. The processed captured image 645 is identical to the second pre-processed captured image 640, except that the resolution is different. The processed captured image 645 includes an image 645*a*, which is identical to the image 640*a* except for the resolution. Note that the resizing process may be performed not only on the second pre-processed captured image data 640*d*, but also on any of the image data 610*d*, 620*d*, 630*d*, and 640*d* that represent an image containing a captured image of the label sheet 800.

In S374 the processor 210 inputs the processed captured image data 645*d* (see FIG. 9) into the image generation model 300 (see FIG. 4A) to produce generated image data 650*d* (generation process). FIG. 10 illustrates an example of a generated image 650 represented by the generated image data 650*d*, which has been generated from the processed captured image data 645*d*. The generated image 650 includes an image 650*a* of the label sheet 800 with no defects (without the scratch (scratch image 801) in this example). As described in FIGS. 5 and 6, the image generation model 300 has been trained to produce generated image data representing an image of the defect-free label sheet 800. Hence, even when the processed captured image data 645*d* inputted into the image generation model 300 represents an image of the label sheet 800 with the scratch (an image containing the scratch image 801), the generated image data 650*d* produced by the image generation model 300 represents an image of the label sheet 800 without the scratch (an image without the scratch image 801).

In S378 of FIG. 8, the processor 210 generates difference image data 660*d* showing the differences between the generated image data 650*d* and the processed captured image data 645*d* inputted into the image generation model 300. FIG. 10 illustrates an example of an image 660 represented by the difference image data 660*d* (hereinafter called the "difference image 660"). Each pixel in the difference image 660 indicates the difference in color values (luminance values in this case) between the corresponding pixels in the two images 645 and 650. The difference image 660 includes an image 660*a* representing differences in pixels contained in the image of the label sheet 800. Of the plurality of pixels in the image 660*a*, pixels contained in the scratch image 801 shows the largest difference. The remaining pixels in the image 660*a* show smaller differences (e.g., values close to zero).

In S379 of FIG. 8, the processor 210 performs a resizing process on the difference image data 660*d* to generate resized difference image data 665*d*. This resizing process matches the resolution of the difference image data 660*d* to the resolution of the transformed original image data 750*d*. The resized difference image (not illustrated) represented by the resized difference image data 665*d* is identical to the difference image 660 represented by the difference image data 660*d* (see FIG. 10), except that the resolution is different. The portion of the resized difference image corresponding to the object image 800*i* and the design label image 750*a* in the transformed original image 750 (see FIG. 9) have the same resolution and the same outline. This resizing process may be the inverse of the resolution conversion performed in the resizing process of S372, for example. Alternatively, the processor 210 may analyze the difference image 660 and the transformed original image 750 and perform a resizing process that gives the portion of the resized difference image corresponding to the object image 800*i* the same resolution and same outline as the design label image 750*a*.

In S380 of FIG. 8, the processor 210 generates superimposed image data 670*d* representing a superimposed image of the resized difference image (identical to the difference image 660) and the transformed original image 750 by combining the resized difference image data 665*d* and the transformed original image data 750*d*. FIG. 10 illustrates an example of a superimposed image 670 represented by the superimposed image data 670*d*. The superimposed image 670 includes a superimposed label image 670*a*, which is a superimposed image of the design label image 750*a* (see FIG. 9) and the portion of the resized difference image corresponding to the object image 800*i* (identical to the image 660*a* in the difference image 660 of FIG. 10). The superimposed label image 670*a* shows both the image corresponding to the design image 800*i* and the scratch image 801.

In S382 of FIG. 8, the processor 210 performs a projective transformation of the superimposed image data 670*d* to generate transformed superimposed image data 680*d*. Here, the processor 210 performs the inverse of the projective transformation applied in S350. FIG. 10 illustrates an example of an image 680 represented by the transformed superimposed image data 680*d* (hereinafter called the "transformed superimposed image 680"). The transformed superimposed image 680 includes a superimposed label image 680*a*. The superimposed label image 680*a* is obtained through a projective transformation of the superimposed label image 670*a*. The outline of the superimposed label image 680*a* is the same as the outline of the design label image 740*a*, (i.e., the outline of the design image 800*i* in the original image 710) in the second pre-processed original image 740 (see FIG. 9), which is the processing target of S350. The superimposed label image 680*a* is not skewed relative to the transformed superimposed image 680.

In S384 of FIG. 8, the processor 210 uses the transformed superimposed image data 680*d* to generate output data 690*d*. FIG. 10 illustrates an example of an image 690 represented by the output data 690*d* generated using the transformed superimposed image data 680*d* (hereinafter called the "output image 690"). The output image 690 includes a superimposed label image 690*a*. The superimposed label image 690*a* shows the superimposed label image 680*a* and a frame image 699 depicting a frame around the scratch depicted by the scratch image 801. In the present embodiment, the processor 210 analyzes the resized difference image to detect a defective portion having a plurality of contiguous pixels indicating a difference greater than or equal to the prescribed difference threshold and superimposes an image of a frame surrounding the detected defective portion on the transformed superimposed image 680. When the label sheet 800 has no defects, the processor 210 does not detect a defective portion in the resized difference image and, hence, the output image 690 is substantially the same as the second pre-processed original image 740 (see FIG. 9).

In S386 of FIG. 8, the processor 210 performs a results outputting process using the output data 690*d*. In the present embodiment, the processor 210 displays the output image 690 represented by the output data 690*d* on the display unit 240 (see FIG. 1). When viewing the display unit 240, the operator can easily discern whether the label sheet 800 has any defects in appearance. When the label sheet 800 has any defects, the operator can easily determine the locations of the defects on the label sheet 800 based on the displayed frames (e.g., the frame image 699 in FIG. 10). Moreover, the operator can easily find these defects (e.g., the scratch corresponding to the scratch image 801) on the actual label sheet 800 by comparing the displayed output image 690 to the actual label sheet 800. Here, the output image 690, like the captured image, has noise and blur. Therefore, any sense of unease that the operator may experience when visually comparing the output image 690 to the actual label sheet 800 can be reduced. After completing the process in S386, the processor 210 ends the inspection process of FIGS. 7 and 8.

The operator may perform various processes based on the outputted results. For example, when the label sheet 800 has a defect, the operator may remove the MFP 900 having this label sheet 800 from the production line for MFPs 900.

In the inspection process of FIGS. 7 and 8 described in the above embodiment, the processor 210 (FIG. 1) generates the transformed original image data 750*d* from the original image data 710*d* by executing a first image process S910 comprising steps S324, S328, S340, and S350 (FIGS. 7 and 8). In other words, by executing the first image process S910 using the original image data 710*d*, the processor 210 generates the transformed original image data 750*d* (hereinafter referred to as the "processed original image data 750*d*"). Here, the original image data 710*d* (see FIG. 9) is image data representing the object image 800*i* to be printed.

The processor 210 generates the processed captured image data 645*d* from the captured image data 610*d* by executing a second image process S920 comprising steps S322, S326, S332, and S372 (FIGS. 7 and 8). In other words, by executing the second image process S920 using the captured image data 610*d*, the processor 210 generates the processed captured image data 645*d*. Here, the captured image data 610*d* (FIG. 9) represents a captured image 610*a* of a label sheet 800, and the label sheet 800 is produced by printing an object image 800*i*, that is, the label sheet 800 has a printed object image 800*i*. Hereinafter, the captured image 610*a* will be also called the captured object image 610*a*, and the printed object image 800*i* will be also called the printed object 800.

The processor 210 generates the output data 690*d* from the processed original image data 750*d* and processed captured image data 645*d* by executing a third image process S990 comprising steps S374, S378, S379, S380, S382, and S384 (FIG. 8). As illustrated in FIG. 10, the output data 690*d* is an example of data related to defects in the appearance of a printed object 800.

Here, the first image process S910 (FIGS. 7 and 8) includes a first process S810 (and specifically S328, S342, S344, and S346 of FIG. 7 and S350 of FIG. 8), which is not included in the second image process S920. Various processes suitable for generating the processed original image data 750*d* from the original image data 710*d* may be employed as the first process. Additionally, the second image process S920 includes a second process S820 (and specifically S326, S334, and S336 of FIG. 7 and S372 of FIG. 8), which is not included in the first image process S910. Various processes suitable for generating the processed captured image data 645*d* from the captured image data 610*d* may be employed as the second process. Hence, by using suitably generated processed original image data 750*d* and suitably generated processed captured image data 645*d*, the processor 210 can generate suitable output data 690*d* related to defects in the appearance of a printed object 800.

The first process S810 included in the first image process S910 (FIGS. 7 and 8) includes a pre-process (S340) involving both a noise adding process (S342 and S344) and a blurring process (S346). Therefore, the processed original image 650 represented by the processed original image data 750*d* has noise and blur, just as in the captured image represented by the captured image data. By using the processed original image data 750*d* and processed captured image data 645*d*, the processor 210 can generate suitable output data 690*d* related to defects. For example, the output image 690 may have noise and blur, just like the processed original image (transformed original image) 750 represented by the processed original image data 750*d*. Therefore, the unease experienced by an operator observing the output image 690 and the actual label sheet 800 can be reduced.

Further, the object image 800*i* represented by the original image data 710*d* (FIG. 9) is a design image of the label sheet 800. The processor 210 generates the processed original image data 750*d* by executing the first image process S910 (FIGS. 7 and 8) on such original image data 710*d*. The processor 210 also generates the processed captured image data 645*d* by executing the second image process S920 on the captured image data 610*d* representing the captured object image 610*a*, which is a photographed image of the label sheet 800. By subsequently executing the third image process S990 using the processed original image data 750*d* and processed captured image data 645*d*, the processor 210 generates the output data 690*d*, which is data related to defects in the appearance of the label sheet 800. As described above, the third image process S990 includes a process (S374) using the image generation model 300 that has been trained. Additionally, the first image process S910 includes the first process S810, which is not included in the second image process S920, while the second image process S920 includes the second process S820, which is not included in the first image process S910. In the present embodiment, the first process S810 includes a pre-process (S340) that involves both a noise adding process (S342 and S344) and a blurring process (S346). The processor 210 also trains the image generation model 300 using sets of training image data I1*td*. The sets of training image data I1*td* are generated when the processor 210 executes a generation process S930 on the original image data 710*d*. The generation process S930 is an image process including steps S130-S160 in FIG. 5. The generation process S930 includes a process (S140) identical to the pre-process of FIG. 7 (S340). Thus, the same degree of noise and the same degree of blur are added to the images in the generation process S930 for generating the training image data I1*td* and the first image process S910 for generating the processed original image data 750*d*. This configuration improves consistency between the first image process S910 and the process that uses the trained image generation model 300 (and specifically S374). By using image data 750*d* and 650*d* generated according to these processes S910 and S374, the processor 210 can generate suitable output data 690*d* related to defects in the appearance of the label sheet 800.

As described in FIGS. 4A, 4B, 5, and 6, the image generation model 300 is also trained to produce sets of generated image data I1*xd* representing generated images I1*x* from sets of training image data I1*td* representing training images I1*t*. Each generated image I1*x* contains an image I1*xa* of a defect-free label sheet 800 corresponding to an image I1*ta* of the label sheet 800 contained in the respective training image I1*t*. With this configuration, the processor 210 can generate data representing images of defects in the label sheet 800 (the difference image data 660*d* in this embodiment) using image data generated by the image generation model 300. The processor 210 uses such difference image data 660*d* to generate suitable output data 690*d*.

The first process S810 in the first image process S910 (FIG. 7) also includes a first color adjustment process (S328). The first color adjustment process adjusts the color distribution in the gray original image 720 represented by the gray original image data 720*d* being processed to be closer to the color distribution in the gray capture image 620 represented by the gray captured image data 620*d* based on the captured image data 610*d*. The second process S820 in the second image process S920 includes the second color adjustment process (S326). The second color adjustment process adjusts the color distribution in the gray captured image 620 represented by the gray captured image data 620*d* being processed to be closer to the color distribution in the gray original image 720 represented by the gray original image data 720*d* based on the original image data 710*d*. These color adjustment processes (S326 and S328) reduce the difference in color distribution between the first pre-processed captured image 630 (FIG. 9) and the first pre-processed original image 730. Hence, the difference in color distribution between images represented by image data 750*d* and 645*d* generated through the respective image processes S910 and S920 is reduced. The processor 210 can then generate suitable output data 690*d* using this image data 750*d* and 645*d*.

The second process S820 in the second image process S920 (FIGS. 7 and 8) includes a pre-process (S332) that involves both a noise reduction process (S336) and a blur reduction process (S334). Therefore, when the captured label image 610 has an unexpectedly large amount of noise or blur, the processor 210 can mitigate the effects of such noise and blur on the output data 690*d*. This can reduce the possibility that the processor 210 will generate output data 690*d* that does not show any defects when the label sheet 800 in fact has defects, for example. Thus, by using the processed original image data 750*d* and the processed captured image data 645*d*, the processor 210 can generate suitable output data 690*d* related to defects.

The first process S810 in the first image process S910 (FIG. 8) includes an outline matching process (S350). The process of S350 is performed to match the outline of a portion of the second pre-processed original image 740 represented by the second pre-processed original image data 740*d* being processed (FIG. 9) that corresponds to the object image 800*i* (the design label image 740*a* in this case) with the outline of the image 640*a* of the label sheet 800 in the second pre-processed captured image 640 (identical to the outline of the captured target image 610*a* in the captured label image 610). Through this process, the processor 210 can reduce differences in the outlines of the image of the label sheet 800 between the image data 750*d* and 645*d* generated through the respective image processes S910 and S920. By using this image data 750*d* and 645*d*, the processor 210 can generate suitable output data 690*d*.

The first process S810 in the first image process S910 (FIGS. 7 and 8) includes a first color adjustment process (S328), a pre-process (S340), and an outline matching process (S350). The first color adjustment process (S328) is performed to adjust the color distribution in the gray original image 720 represented by the gray original image data 720*d* based on the original image data 710*d* (FIG. 9) to be closer to the color distribution in the gray captured image 620 represented by the gray captured image data 620*d* based on the captured image data 610*d*. The pre-process (S340) is performed on the first pre-processed original image data 730*d* produced from the first color adjustment process (S328). The outline matching process (S350) is performed to match the outline of a portion of the second pre-processed original image 740 represented by the second pre-processed original image data 740*d* produced from the pre-process (S340) that corresponds to the object image 800*i* (the design label image 740*a* in this case) with the outline of the image 640*a* of the label sheet 800 in the second pre-processed captured image 640 (identical to the outline of the captured target image 610*a* in the captured label image 610). This configuration reduces differences between the image data 750*d* and 645*d* generated through the respective image processes S910 and S920, excluding any defects in the appearance of the label sheet 800 (the scratch corresponding to the scratch image 801, etc.), and specifically differences in color distribution, noise, blurring, and the outline of the image of the label sheet 800. By using this image data 750*d* and 645*d*, the processor 210 can generate suitable output data 690*d*.

The third image process S990 of FIG. 8 includes S374, S378, S379, S380, S382, and S384. In S374 and S378, the processor 210 generates difference image data 660*d* representing a difference image 660. The difference image 660 depicts portions that differ between the processed captured image 645 represented by the processed captured image data 645*d* and an image of a defect-free label sheet 800 (the generated image 650 represented by the generated image data 650*d* in this case). In S379 the processor 210 resizes the difference image 660 represented by the difference image data 660*d* to generate the resized difference image data 665*d*. In S380 the processor 210 combines the resized difference image data 665*d* with the processed original image data 750*d* to produce superimposed image data 670*d* representing a superimposed image of the resized difference image (identical to the difference image 660) and the transformed original image 750. In S382 and S384, the processor 210 uses the superimposed image data 670*d* to generate the output data 690*d*. In the present embodiment, in S382 the processor 210 matches the outline of the portion 670*a* corresponding to the object image 800*i* in the super imposed image 670 represented by the superimposed image data 670*d* with the outline of the object image 800*i* in the original image 710 represented by the original image data 710*d* (FIG. 9). The outline of the portion 680*a* of the transformed superimposed image 680 corresponding to the design image 800*i* is identical to the outline of the design image 800*i*. In S384 the processor 210 generates output data 690*d* representing the output image 690 that depicts a superimposed image of the transformed superimposed image 680 and an image of a frame (e.g., the frame image 699). The transformed superimposed image 680 depicts a superimposed image of the resized difference image represented by the resized difference image data 665*d* (identical to the difference image 660 represented by the difference image data 660*d*) and the transformed original image 750 represented by the processed original image data 750*d*. Accordingly, the processor 210 can generate suitable output data 690*d* showing defective portions of the label sheet 800.

B. Modifications of the Embodiment

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(1) The filter used in the noise reduction process of S336 (FIG. 7) may be any of various filters in place of the mean filter, such as a Gaussian filter or a median filter. The noise reduction process may also be any of various processes for smoothing color values instead of a process using a filter.

(2) The noise adding process in S150 of FIG. 5 and S342 and S344 of FIG. 7 may be various other processes instead of the process described in the embodiment. For example, the noise adding process may superimpose a noise image indicating the noise value for each pixel on the image being processed. The noise image may be determined experimentally in advance. The processor 210 may randomly select a noise image to be superimposed on the image being processed from among a plurality of prepared noise images. In either case, the noise adding process employed in S340 of FIG. 7 is preferably the same as the noise adding process employed in the process for generating training image data in FIG. 5, but the processes may be different from each other.

(3) Any method may be used to determine the motion vector used in the blur reduction process of S334 (FIG. 7). For example, a speed sensor may be fixed to the MFP 900, and the motion vector may be determined on the basis of the speed of the MFP 900 when the MFP 900 is being photographed for inspection. The blur reduction process may be implemented using any other method in place of the above method using a point spread function and Wiener filter. For example, the blur reduction process may be performed using a procedure known as Lucy-Richardson deconvolution. This method can reduce blur based on a point spread function. Another possibility is an algorithm called "interactive back projection" or a technique employing a convolutional neural network called "Deep Generative Filter for Motion Deblurring." In addition to motion blur, a process may be performed to reduce blur caused by the focal point of the camera deviating from the label sheet 800. For example, blur may be reduced through a process known as "Image deblurring" in the Python library called "PyLops".

(4) The blurring process in S160 of FIG. 5 and S346 of FIG. 7 may be achieved through various other processes instead of the process in the above embodiment. For example, the blurring process may include smoothing with a smoothing filter.

(5) The four portions used in the projective transformation of S350 (FIG. 8) are not limited to the four corners of the label sheet 800 but may be any portions of the label sheet 800. Additionally, any of various methods for calculating the coordinates of the four portions may be employed instead of the process in the above embodiment. For example, the coordinates of each of the four portions may be determined through pattern matching using four reference images representing the four portions.

(6) The inspection process may be various other processes instead of the process in FIGS. 7 and 8. For example, the first image process S910 may include a resizing process similar to S372 performed on the processed original image data 750*d*. Additionally, execution of the plurality of processes in the first image process S910 (the grayscale conversion in S324, the first color adjustment in S328, the noise addition in S342 and S344, the blurring in S346, and the projective transformation in S350) may be performed in various other orders. For example, the first color adjustment in S328 may be performed on image data produced through the pre-process of S340. The first image process S910 and the second image process S920 form three pairs PP1-PP3 of image processes having the same focus, as indicated below.

(PP1) S324, S322 (color space)

(PP2) S328, S326 (color distribution)

(PP3) S340, S332 (image degradation (noise and blur))

In order to improve consistency between the image processes S910 and S920, the elements of these three pairs PP1-PP3 are preferably performed in the same order between the image processes S910 and S920. For example, if S328 (first color adjustment) is executed after S340 (pre-process) in the first image process S910, S326 (second color adjustment) is preferably executed after S332 (pre-process) in the second image process S920.

One or more of the plurality of processes in the first image process S910 (the grayscale conversion in S324, the first color adjustment in S328, the noise addition in S342 and S344, the blurring in S346, and the projective transformation in S350) may be omitted. For example, when positioning accuracy between the MFP 900 (FIG. 2) and the digital camera 110 is good during photographing, i.e., when there is little positional deviation of the label sheet 800 within the captured image, the projective transformation of S350 may be omitted. In this case, the projective transformation of S382 may also be omitted. S382 may be omitted regardless of whether S350 is omitted. Alternatively, S350 may be omitted and instead the second image process S920 may include the same process of projective transformation described in S382. In this case, the image 645*a* of the label sheet 800 in the processed captured image 645 generated through the second image process S920 will have the same outline as the design image 800*i* in the original image 710. (For example, the image 645*a* of the label sheet 800 will not be skewed relative to the processed captured image 645.) In S380 the processor 210 generates superimposed image data 670*d* representing a non-skewed image of the label sheet 800. In this case, S382 may be omitted. Similarly, one or more of the plurality of processes in the second image process S920 (the grayscale conversion in S322, the second color adjustment in S326, the blur reduction in S334, the noise reduction in S336, and the resizing in S372) may be omitted. However, when a process forming one of the above pairs PP1-PP3 is omitted from the first image process S910, the corresponding process is preferably omitted from the second image process S920, but it is also possible to omit just one of the two processes forming a pair. For example, one or both of S328 (first color adjustment) and S326 (second color adjustment) may be omitted.

(7) The pre-processes of S340 and S332 (FIG. 7) may be implemented in various ways. For example, one of the noise addition of S342 and S344 and the blurring of S346 may be omitted from the pre-process of S340. When the noise addition of S342 and S344 is omitted, it is preferable also to omit the noise reduction of S336 from the pre-process of S332, which targets the same perspective. When the blurring of S346 is omitted, it is preferable also to omit the blur reduction of S344 from the pre-process of S332, which targets the same quality. Further, one or both of the pre-processes of S340 and S332 may be omitted.

(8) The first process S810 in the first image process S910 (FIGS. 7 and 8) may be configured of various processes not included in the second image process S920. For example, one or more of the first color adjustment of S328, the noise addition of S342 and S344, the blurring of S346, and the projective transformation of S350 may be omitted. Similarly, the second process S820 in the second image process S920 may be configured of various processes not included in the first image process S910. For example, one or more of the second color adjustment of S326, the blur reduction of S334, the noise reduction of S336, and the resizing of S372 may be omitted.

(9) The color adjustment processes of S328 and S326 (FIG. 7) may be implemented in various ways. For example, the image data to undergo the first color adjustment process of S328 is not limited to the gray original image data 720*d* but may be various image data based on the original image data 710*d*. Here, image data based on the original image data 710*d* is either the original image data 710*d* itself or image data obtained by performing an image process on the original image data 710*d*. The first color adjustment process of S328 may be performed on image data generated from the pre-process of S340, for example. Further, the reference color distribution used in the first color adjustment process of S328 is not limited to the color distribution in the gray captured image 620 represented by the gray captured image data 620*d* but may be the color distribution of various image represented by image data based on the captured image data 610*d*. Here, image data based on the captured image data 610*d* is either the captured image data 610*d* itself or image data obtained by performing an image process on the captured image data 610*d*. The reference color distribution used in the first color adjustment process of S328 may also be the color distribution in an image represented by image data generated in the pre-process of S332, for example. The color space of the reference color distribution is preferably the same as the color space of the image data being processed. When the color space is represented by a plurality of color components, histogram matching may be performed for each color component.

Similarly, image data to be subjected to the second color adjustment process of S326 may be various image data based on the captured image data 610*d* in place of the gray captured image data 620*d*. The reference color distribution used in the second color adjustment process of S326 is also not limited to the color distribution in the gray original image 720 represented by the gray original image data 720*d* but may be the color distribution of various image represented by image data based on the original image data 710*d*. In the second color adjustment process of S326, the color space of the reference color distribution is also preferably the same as the color space of the image data being processed.

As in the example of FIG. 7, the image data to be subjected to the first color adjustment process of S328 preferably indicates the reference color distribution used in the second color adjustment process of S326, and the image data to be subjected to the second color adjustment process of S326 preferably indicates the reference color distribution to be used in the first color adjustment process of S328. This configuration improves consistency between the first color adjustment process of S328 and second color adjustment process of S326.

Instead of the process described in FIG. 11A, various other processes may be used to adjust the color distribution in the image represented by the image data being processed to be closer to the reference color distribution. For example, a tone curve adjustment process may be performed to adjust representative color values of the image data being processed (e.g., median values of a plurality of color values for a plurality of pixels) to be closer to the representative color values of image data representing the reference color distribution.

(10) The process for generating training image data, i.e., the training image data generation process may be various processes and is not limited to the process described in FIG. 5. For example, various processes known as data augmentation, such as an image rotation process and an image moving process, may be executed. In a rotating process, the rotation angle may be randomly set for each set of training image data I1*td*. In a moving process, the direction and amount of movement may be randomly set for each set of training image data I1*td*. Further, the training image data generation process may include processes randomly set for each set of training image data I1*td*. For example, processes may be randomly selected from among a plurality of processes including a noise adding process, a blurring process, an image rotating process, and an image moving process. One or both of the noise adding process and blurring process are preferably included in the training image data generation process and the first process S810 (FIG. 7). Further, the training image data may be generated using captured image data of the label sheet 800 instead of the gray original image data 720*d*. The processor 210 may generate a plurality of sets of training image data through data augmentation using the captured image data. One or both of the noise adding process and the blurring process on the captured image data may be omitted.

(11) The label sheet 800 (see FIG. 2) may be provided on any product and not just the MFP 900, such as a sewing machine, a cutting machine, or a portable terminal. Further, the object for inspection need not be the label sheet 800 but may be any product, such as a multi-function peripheral, a sewing machine, a cutting machine, or a portable terminal. Here, the entire product or a portion of the product may be inspected.

The object image represented by the original image data is not limited to an image to be printed but may be any suitable image depicting the appearance of the object for inspection. For example, the object image may be engineering drawing of the object or a photographed image of the appearance of the object. The object image is preferably an image to be printed or a design image of a target object, such as engineering drawing. With this configuration, the processor 210 can generate suitable output data related to defects in the appearance of an object.

(12) The image generation model 300 is preferably trained to generate an image of an object with no defects (defect-free object image) based on captured images of the object. With this configuration, the processor 210 can use image data inputted into the image generation model 300, image data generated by the image generation model 300, and processed original image data generated through the first image process to generate suitable output data related to defects.

Instead of a variational autoencoder, the image generation model 300 may be any of various other models that generate image data using image data, such as an autoencoder or generative adversarial network. A variety of processes suited to the image generation model 300 may be used in the training process for training the image generation model 300. For example, the plurality of model parameters in the image generation model 300 may be adjusted as follows. Specifically, the image generation model 300 may be trained to reduce the difference between generated image data produced by inputting image data of a defect-free object into the image generation model 300 and the image data inputted into the image generation model 300. With this configuration, the trained image generation model 300 can generate an image of a defect-free object (defect-free object image) when an image of an object having defects is inputted into the image generation model 300.

The image data inputted into the image generation model 300 may be color image data. The image generation model 300 may be configured to generate color image data from color image data. The image generation model 300 may also be configured to generate grayscale image data from color image data. Note that the process using the image generation model 300 (S374 of FIG. 8) may be omitted. For example, the processor 210 may detect an object in the processed captured image 645 represented by the processed captured image data 645*d* through pattern matching using a reference object image, which is a reference image of a defect-free object. In S378 the processor 210 may then generate difference image data showing the differences between the reference object image arranged at the position of the detected object, and the image represented by the processed captured image data 645*d*.

(13) The data process for inspection is not limited to the processes in the embodiment and modifications described above, and may be any of various processes. For example, the data process for inspection may be performed using color image data and not grayscale image data. Alternatively, the data process for inspection may be performed using grayscale image data and not color image data. Further, the third image process for generating output data may be any of various processes in place of the third image process S990 of FIG. 8. For example, a resizing process may be performed on image data based on the original image data 710*d* (e.g., the processed original image data 750*d*) instead of the difference image data 660*d* (S379) in order to superimpose the difference image on the transformed original image 750. The output data 690*d* may also be any data that specifies defects possessed by an object when the object possesses such defects rather than image data representing the output image 690 (FIG. 10). For example, the output data may represent image data depicting defective areas in color and other areas in grayscale. However, the output data is not limited to image data and may be data indicating any information about defects, such as the total number of defects.

In any case, the processor 210 may perform a process to output data related to defects using the output data. The method of outputting data related to defects is not limited to the method of S386 (FIG. 8) and may be any method. For example, the processor 210 may output output data specifying inspection results to a storage device (e.g., the non-volatile storage device 230 or an external storage device not illustrated in the drawings that is connected to the data processing apparatus 200). In this case, the data processing apparatus 200 stores data specifying the inspection results in the storage device. Alternatively, the processor 210 may output an image represented by the output data to the display unit 240, in which case the inspection results are displayed on the display unit 240.

(14) The data processing apparatus 200 in FIG. 1 may be various devices other than a personal computer, such as a digital camera or a smartphone. Further, a plurality of devices that can communicate over a network (e.g., computers) may each implement some of the functions in the data process performed by the data processing apparatus so that the devices as a whole can provide the functions required for the data process. (Here, the system comprising these devices corresponds to the data processing apparatus.)

Part of the configuration implemented in hardware in the embodiment described above may be replaced with software and, conversely, all or part of the configuration implemented in software may be replaced with hardware. For example, the functions of the color adjustment processes in FIG. 7 (S326 and S328) may be implemented with a dedicated hardware circuit.

When some or all of the functions of the present disclosure are implemented with computer programs, the programs may be stored on a computer-readable storage medium (e.g., a non-transitory storage medium). The programs may be used on the same storage medium (a computer-readable storage medium) on which they have been supplied or may be transferred to and used on a different storage medium (a computer-readable storage medium). A "computer-readable storage medium" may be a portable storage medium, such as a memory card or CD-ROM; an internal storage device built into the computer, such as any of various ROM; or an external storage device, such as a hard disk drive, connected to the computer.

What is claimed is:

1. A non-transitory computer-readable storage medium storing a set of computer-readable instructions for a computer configured to perform processing on image data, the set of computer-readable instructions, when executed by the computer, causing the computer to perform:

generating processed original image data by executing a first image process on original image data, the original image data representing an object image to be printed;

generating processed captured image data by executing a second image process on captured image data, the captured image data representing a captured object image, the captured object image being obtained by capturing an image of a printed object, the printed object being produced by printing the object image; and generating output data by executing a third image process on the processed original image data and the processed captured image data, the output data being related to a defect in an appearance of the printed object, wherein the first image process comprises a first process, the first process being not included in the second image process, wherein the second image process comprises a second process, the second process being not included in the first image process, wherein the second image process comprises a first resizing process, the first resizing process, when executed on first target image data representing a first target image, changing a size of the first target image, wherein the third image process comprises:

a difference image generation process executed on the processed captured image data representing a processed captured image to generate difference image data representing a difference image, the difference image depicting difference of a portion of the processed captured image corresponding to the captured object image from a defect-free object image;

a second resizing process executed on the difference image data to generate resized difference image data representing a resized difference image, a size of the resized difference image being changed from a size of the difference image; and an output data generation process executed on the resized difference image data and the processed original image data to generate the output data, the output data representing a superimposed image of the resized difference image and a processed original image represented by the processed original image data, and wherein the second image process does not comprise an edge extraction process.

2. The non-transitory computer-readable storage medium according to claim 1, wherein the first process comprises a pre-process, the pre-process comprising at least one of a noise adding process and a blurring process, the noise adding process, when executed on second target image data representing a second target image, adding noise to the second target image, the blurring process, when executed on third target image data representing a third target image, blurring the third target image.

3. The non-transitory computer-readable storage medium according to claim 2, wherein the first process comprises:

a color adjustment process executed on fourth target image data to generate first processed image data, the fourth target image data being based on the original image data and representing a fourth target image, the color adjustment process adjusting color distribution in the fourth target image to be closer to color distribution in a fifth target image represented by fifth target image data based on the captured image data;

the pre-process executed on the first processed image data to generate second processed image data; and an outline matching process executed on the second processed image data representing a processed image, the outline matching process matching an outline of a portion of the processed image corresponding to the object image with an outline of the captured object image.

4. The non-transitory computer-readable storage medium according to claim 1, wherein the first process comprises a first color adjustment process, the first color adjustment process, when executed on second target image data representing a second target image, adjusting color distribution in the second target image to be closer to color distribution in a third target image represented by third target image data based on the captured image data, and wherein the second process comprises a second color adjustment process, the second color adjustment process, when executed on fourth target image data representing a fourth target image, adjusting color distribution in the fourth target image to be closer to color distribution in a fifth target image represented by fifth target image data based on the original image data.

5. The non-transitory computer-readable storage medium according to claim 1, wherein the second process comprises a pre-process, the pre-process comprising at least one of a noise reduction process and a blur reduction process, the noise reduction process, when executed on second target image data representing a second target image, reducing noise in the second target image, the blur reduction process, when executed on third target image data representing a third target image, reducing blur in the third target image.

6. The non-transitory computer-readable storage medium according to claim 1, wherein the first process comprises an outline matching process, the outline matching process, when executed on second target image data representing a second target image, matching an outline of a portion of the second target image corresponding to the object image with an outline of the captured object image.

7. A non-transitory computer-readable storage medium storing a set of computer-readable instructions for a computer configured to perform processing on image data, the set of computer-readable instructions, when executed by the computer, causing the computer to perform:

generating processed original image data by executing a first image process on original image data, the original image data representing an object image which is a design image of a target object;

generating processed captured image data by executing a second image process on captured image data, the captured image data representing a captured object image, the captured object image being obtained by capturing an image of the target object; and generating output data by executing a third image process on the processed original image data and the processed captured image data, the output data being related to a defect in an appearance of the target object, wherein the third image process comprises a process using a machine learning model that has been trained, wherein the first image process comprises a first process, the first process being not included in the second image process, wherein the second image process comprises a second process, the second process being not included in the first image process, wherein the second image process comprises a first resizing process, the first resizing process, when executed on first target image data representing a first target image, changing a size of the first target image, wherein the third image process comprises:

a difference image generation process executed on the processed captured image data representing a processed captured image to generate difference image data representing a difference image, the difference image depicting difference of a portion of the processed captured image corresponding to the captured object image from a defect-free object image;

a second resizing process executed on the difference image data to generate resized difference image data representing a resized difference image, a size of the resized difference image being changed from a size of the difference image; and an output data generation process executed on the resized difference image data and the processed original image data to generate the output data, the output data representing a superimposed image of the resized difference image and a processed original image represented by the processed original image data, wherein the first process further comprises a pre-process, the pre-process comprising at least one of a noise adding process and a blurring process, the noise adding process, when executed on second target image data representing a second target image, adding noise to the second target image, the blurring process, when executed on third target image data representing a third target image, blurring the third target image, wherein the second image process does not comprise an edge extraction process, and wherein the machine learning model has been trained using training image data, the training image data being generated by executing processes including a process identical to the pre-process on the original image data.

8. The non-transitory computer-readable storage medium according to claim 7, wherein the machine learning model has been trained to generate generated image data from input image data representing an image of the target object, the generated image data representing a defect-free object image.

9. The non-transitory computer-readable storage medium according to claim 7, wherein the first process comprises a first color adjustment process, the first color adjustment process, when executed on fourth target image data representing a fourth target image, adjusting color distribution in the fourth target image to be closer to color distribution in a fifth target image represented by fifth target image data based on the captured image data, and wherein the second process comprises a second color adjustment process, the second color adjustment process, when executed on sixth target image data representing a sixth target image, adjusting color distribution in the sixth target image to be closer to color distribution in a seventh target image represented by seventh target image data based on the original image data.

10. The non-transitory computer-readable storage medium according to claim 7, wherein the second process comprises a pre-process, the pre-process comprising at least one of a noise reduction process and a blur reduction process, the noise reduction process, when executed on fourth target image data representing a fourth target image, reducing noise in the fourth target image, the blur reduction process, when executed on fifth target image data representing a fifth target image, reducing blur in the fifth target image.

11. The non-transitory computer-readable storage medium according to claim 7, wherein the first process comprises an outline matching process, the outline matching process, when executed on fourth target image data representing a fourth target image, matching an outline of a portion of the fourth target image corresponding to the object image with an outline of the captured object image.

12. The non-transitory computer-readable storage medium according to claim 8, wherein the first process comprises:

a color adjustment process executed on fourth target image data to generate first processed image data, the fourth target image data being based on the original image data and representing a fourth target image, the color adjustment process adjusting color distribution in the fourth target image to be closer to color distribution in a fifth target image represented by fifth target image data based on the captured image data;

the pre-process executed on the first processed image data to generate second processed image data; and an outline matching process executed on the second processed image data representing a processed image, the outline matching process matching an outline of a portion of the processed image corresponding to the object image with an outline of the captured object image.

13. A non-transitory computer-readable storage medium storing a set of computer-readable instructions for a computer configured to perform processing on image data, the set of computer-readable instructions, when executed by the computer, causing the computer to perform:

generating processed original image data by executing a first image process on original image data, the original image data representing a photographed image of an appearance of a target object;

generating processed captured image data by executing a second image process on captured image data, the captured image data representing a captured object image, the captured object image being obtained by capturing an image of a printed object, the printed object being produced by printing an object image; and generating output data by executing a third image process on the processed original image data and the processed captured image data, the output data being related to a defect in an appearance of the printed object, wherein the first image process comprises a first process, the first process being not included in the second image process, wherein the second image process comprises a second process, the second process being not included in the first image process, wherein the second image process comprises a first resizing process, the first resizing process, when executed on first target image data representing a first target image, changing a size of the first target image, wherein the third image process comprises:

a difference image generation process executed on the processed captured image data representing a processed captured image to generate difference image data representing a difference image, the difference image depicting difference of a portion of the processed captured image corresponding to the captured object image from a defect-free object image;

a second resizing process executed on the difference image data to generate resized difference image data representing a resized difference image, a size of the resized difference image being changed from a size of the difference image; and an output data generation process executed on the resized difference image data and the processed original image data to generate the output data, the output data representing a superimposed image of the resized difference image and a processed original image represented by the processed original image data, and wherein the second image process does not comprise an edge extraction process.

14. The non-transitory computer-readable storage medium according to claim 13, wherein the first process comprises a pre-process, the pre-process comprising at least one of a noise adding process and a blurring process, the noise adding process, when executed on second target image data representing a second target image, adding noise to the second target image, the blurring process, when executed on third target image data representing a third target image, blurring the third target image.

15. The non-transitory computer-readable storage medium according to claim 14, wherein the first process comprises:

a color adjustment process executed on fourth target image data to generate first processed image data, the fourth target image data being based on the original image data and representing a fourth target image, the color adjustment process adjusting color distribution in the fourth target image to be closer to color distribution in a fifth target image represented by fifth target image data based on the captured image data;

the pre-process executed on the first processed image data to generate second processed image data; and an outline matching process executed on the second processed image data representing a processed image, the outline matching process matching an outline of a portion of the processed image corresponding to the object image with an outline of the captured object image.

16. The non-transitory computer-readable storage medium according to claim 13, wherein the first process comprises a first color adjustment process, the first color adjustment process, when executed on second target image data representing a second target image, adjusting color distribution in the second target image to be closer to color distribution in a third target image represented by third target image data based on the captured image data, and wherein the second process comprises a second color adjustment process, the second color adjustment process, when executed on fourth target image data representing a fourth target image, adjusting color distribution in the fourth target image to be closer to color distribution in a fifth target image represented by fifth target image data based on the original image data.

17. The non-transitory computer-readable storage medium according to claim 13, wherein the second process comprises a pre-process, the pre-process comprising at least one of a noise reduction process and a blur reduction process, the noise reduction process, when executed on second target image data representing a second target image, reducing noise in the second target image, the blur reduction process, when executed on third target image data representing a third target image, reducing blur in the third target image.

18. The non-transitory computer-readable storage medium according to claim 13, wherein the first process comprises an outline matching process, the outline matching process, when executed on second target image data representing a second target image, matching an outline of a portion of the second target image corresponding to the object image with an outline of the captured object image.

* * * * *